US012504932B2

(12) United States Patent
Koujiro

(10) Patent No.: US 12,504,932 B2
(45) Date of Patent: Dec. 23, 2025

(54) IMAGE FORMING APPARATUS AND METHOD TO DISPLAY A SCREEN FOR UPDATING FIRMWARE BASED ON RECEIVED FIRMWARE UPDATE INSTRUCTION

(71) Applicant: SHARP KABUSHIKI KAISHA, Sakai (JP)

(72) Inventor: Takuya Koujiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/408,790

(22) Filed: Jan. 10, 2024

(65) Prior Publication Data

US 2024/0231716 A1 Jul. 11, 2024

(30) Foreign Application Priority Data

Jan. 11, 2023 (JP) .................................. 2023-002726

(51) Int. Cl.
G06F 3/12 (2006.01)

(52) U.S. Cl.
CPC ............ *G06F 3/123* (2013.01); *G06F 3/1203* (2013.01); *G06F 3/1285* (2013.01); *G06F 3/1255* (2013.01)

(58) Field of Classification Search
None
See application file for complete search history.

(56) References Cited

U.S. PATENT DOCUMENTS

| 10,778,861 B2* | 9/2020 | Kamasuka | ............... G06F 21/57 |
| 2016/0234396 A1* | 8/2016 | Yasukawa | .......... H04N 1/00973 |
| 2019/0311565 A1* | 10/2019 | Ohtomo | .................. G07D 11/60 |
| 2020/0409685 A1* | 12/2020 | Shimomoto | ............ G06F 8/654 |
| 2020/0412890 A1* | 12/2020 | Hirota | ............... H04N 1/00509 |
| 2021/0089242 A1* | 3/2021 | Ueda | ......................... G06F 8/65 |
| 2022/0294919 A1* | 9/2022 | Seto | .................. H04N 1/00514 |

FOREIGN PATENT DOCUMENTS

| JP | 2016-110377 | * | 6/2016 |
| JP | 2021-140602 A | | 9/2021 |

OTHER PUBLICATIONS

Machine Translation in English of JP Pub 2016-110377 to Hokiyama Takeshi.*

* cited by examiner

*Primary Examiner* — Haris Sabah
(74) *Attorney, Agent, or Firm* — ScienBiziP, P.C.

(57) ABSTRACT

An image forming apparatus includes a display; and one or more controllers that control update processing of firmware for driving a device, wherein the controller displays, on the display, a first screen for confirming to a user whether to update the firmware, in a case where an instruction to update the firmware is received, and displays, on the display, a second screen for receiving an input of authentication information by an administrator, in a case where update of the firmware is permitted.

1 Claim, 28 Drawing Sheets

FIG. 5

| Model Name | Serial Number | FW Update Name | Update Scheduled | Status | Status Changed | FW Version |
|---|---|---|---|---|---|---|
| OO-0001 | 9504615800 | abcdefghijk | 6/7/2022 5:00 PM | Success | 6/7/2022 5:19 PM | 00P20.G1 |
| OO-0003 | 3322445566 | lmnopqrstu | 6/10/2022 5:00 PM | Waiting | | 00T20.S1 |
| OO-0005 | 5533448899 | | | No Reservation | | |
| OO-0006 | 1122889966 | | | No Reservation | | |
| OO-0003 | 3322445567 | | | No Reservation | | |
| OO-0007 | 0787777767 | | | No Reservation | | |

3970

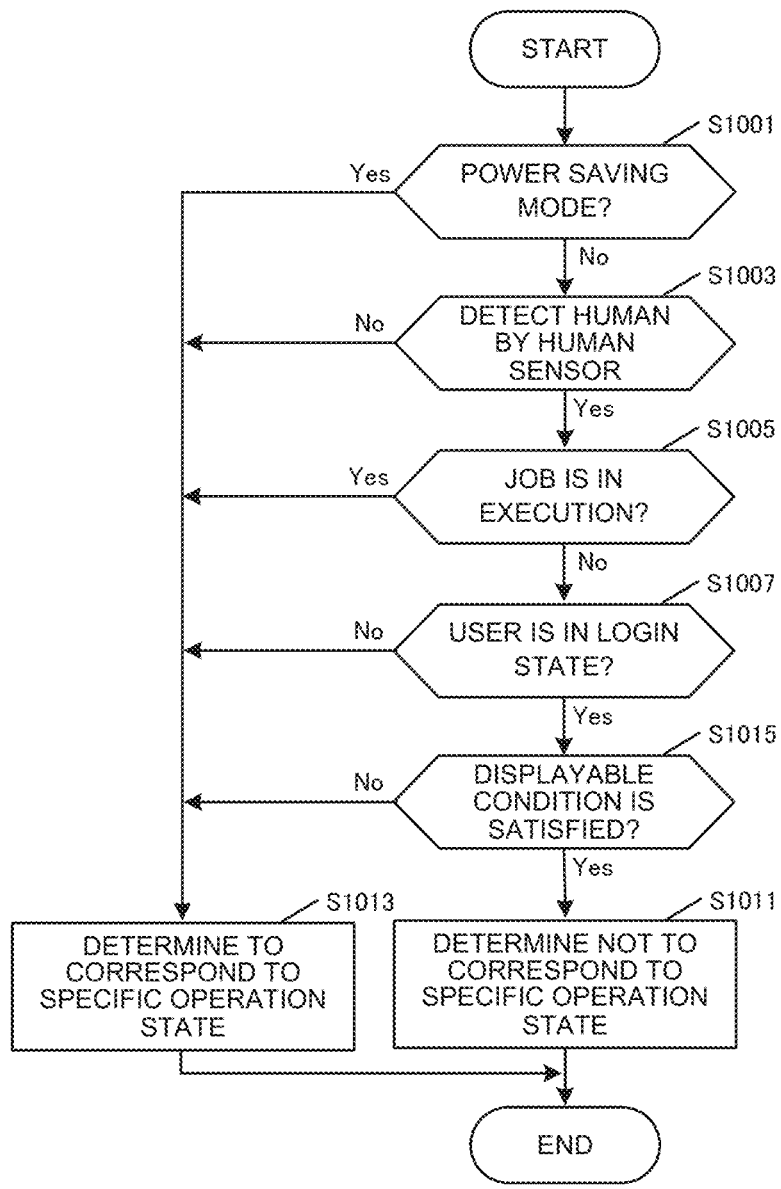

FIG. 19

| No. | SETTING ITEM NAME | SETTING VALUE |
|---|---|---|
| 1 | START FIRMWARE UPDATE AT TIME OF RECOVERY FROM POWER SAVING MODE, OR RECOVERY BY HUMAN SENSOR DETECTION | ON/OFF |
| 2 | NOTIFY EXECUTOR WHEN REMOTE FIRMWARE UPDATE HAS FAILED | ON/OFF |
| 3 | START FIRMWARE UPDATE WHEN POWER IS TURNED ON NEXT TIME, IN CASE WHERE REMOTE FIRMWARE UPDATE INSTRUCTION IS ISSUED AFTER POWER IS TURNED OFF | ON/OFF |
| 4 | DISPLAY WARNING MESSAGE IN CASE WHERE DATE AND TIME ARE SPECIFIED IN REMOTE FIRMWARE UPDATE | ON/OFF |
| 5 | IN CASE WHERE DATE AND TIME ARE SPECIFIED BY REMOTE FIRMWARE UPDATE, START FIRMWARE UPDATE AFTER JOB IS STOPPED OR AFTER JOB IS FINISHED, WHEN JOB OPERATION/EXECUTION IS PERFORMED AT SPECIFIED TIME | START UPDATE AFTER JOB IS STOPPED/ FINISHED |
| 6 | NOTIFY EXECUTOR AGAIN IN CASE WHERE "CANCEL" IS SELECTED IN FIRMWARE UPDATE START MESSAGE | ON/OFF |
| 7 | CHANGE RE-DISPLAY TIMING OF FIRMWARE UPDATE START MESSAGE | AT LOGIN TIME/ AFTER JOB IS FINISHED/ AT ADMINISTRATOR LOGIN TIME/ AT HUMAN SENSOR DETECTION TIME |

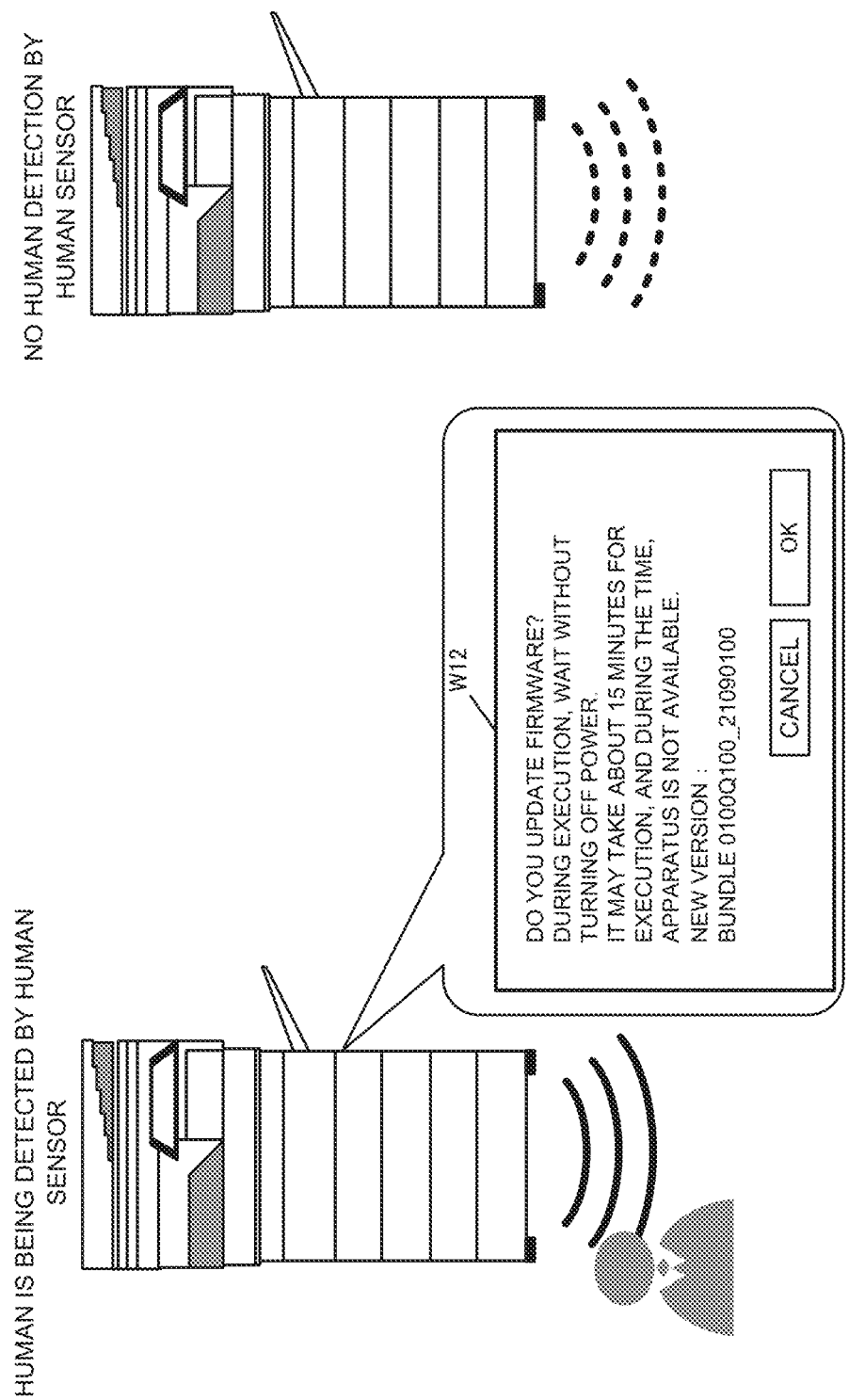

IMAGE FORMING APPARATUS AND METHOD TO DISPLAY A SCREEN FOR UPDATING FIRMWARE BASED ON RECEIVED FIRMWARE UPDATE INSTRUCTION

CROSS-REFERENCE TO RELATED APPLICATION

The present application claims priority from Japanese Application JP 2023-002726, the content of which is hereby incorporated by reference into this application.

BACKGROUND OF THE INVENTION

Field of the Invention

The present disclosure relates to an image forming apparatus, and a method of updating firmware.

Description of the Related Art

An image forming apparatus such as a multifunction peripheral can maintain a good apparatus state by updating firmware to be distributed from a manufacturer, a dealer, or the like.

Generally, when firmware for update is released, firmware update processing is performed by a service provider who undertakes maintenance and management of an image forming apparatus, or a user (hereinafter, simply referred to as an administrator) who has management authority of the image forming apparatus.

For example, a technique for performing update processing of firmware of an information processing apparatus via a Web-UI operation screen has been proposed.

In updating firmware of an image forming apparatus, displaying a confirmation screen on an operation screen included in the image forming apparatus, and controlling update of the firmware have not been considered until now.

An object of the present disclosure is to provide an image forming apparatus and the like capable of improving operability and convenience of a user by displaying a confirmation screen related to whether firmware update can be executed on an operation screen included in the image forming apparatus.

SUMMARY OF THE INVENTION

To solve the above problem, an image forming apparatus according to the present disclosure includes: a display, and a controller that controls update processing of firmware for driving a device. The controller displays, on the display, a first screen for confirming to a user whether to update the firmware, in a case where an instruction to update the firmware is received, and displays, on the display, a second screen for receiving an input of authentication information by an administrator, in a case where update of the firmware is permitted.

Further, a method of updating firmware for driving a device according to the present disclosure includes: displaying, on a display device, a first screen for confirming to a user whether to update the firmware, in a case where an instruction to update the firmware is received; and displaying, on the display device, a second screen for receiving an input of authentication information from an administrator, in a case where update of the firmware is permitted.

According to the present disclosure, it is possible to provide an image forming apparatus and the like capable of improving operability and convenience of a user by displaying a confirmation screen related to whether firmware update can be executed on an operation screen included in the image forming apparatus.

BRIEF DESCRIPTION OF THE DRAWINGS

FIG. 5 is a diagram illustrating a configuration of a data structure of a firmware update setting table.

FIG. 18 is a flowchart illustrating a flow of processing according to the third embodiment.

FIG. 19 is a diagram illustrating a fifth embodiment.
FIG. 28 is a diagram illustrating the fifth embodiment.

DETAILED DESCRIPTION OF THE INVENTION

Hereinafter, embodiments according to the present disclosure are described with reference to the drawings. Note that, the following embodiments are an example for describing the present disclosure, and the technical scope of the description described in the claims is not limited to the following description.

Until now, in firmware update, for example, in a case where update is executed via a Web-UI, displaying a confirmation screen related to whether firmware update can be executed on an operation screen of an image forming apparatus has not been considered. In a case as described above, firmware update may be started at an unexpected timing to a user who uses an image forming apparatus.

Further, in a case where a confirmation screen related to whether firmware update can be executed is not displayed on an operation screen of an image forming apparatus, there is no means for the user who uses the image forming apparatus to cancel update of the firmware, and in a case where a firmware update instruction is issued during execution of a job or the like, the job may be temporarily interrupted, which may impair operability and convenience of the user.

In the present disclosure, an image forming apparatus capable of improving operability and convenience of a user by displaying a confirmation screen related to whether firmware update can be executed on an operation screen included in the image forming apparatus is achieved by the following embodiments.

1. First Embodiment

In a first embodiment, a multifunction peripheral capable of executing, by one housing, a job to be executed by a device in each mode such as printing, copying, scanning, faxing, and Internet faxing is described as an embodiment of an image forming apparatus. The multifunction peripheral according to the first embodiment is an image forming apparatus capable of updating firmware at a predetermined execution timing. Note that, in the first embodiment, an embodiment is described in which firmware update of a multifunction peripheral (device) is executed based on, as a predetermined execution timing, a firmware update instruction output from a firmware providing device by a remote instruction.

Figure 1:
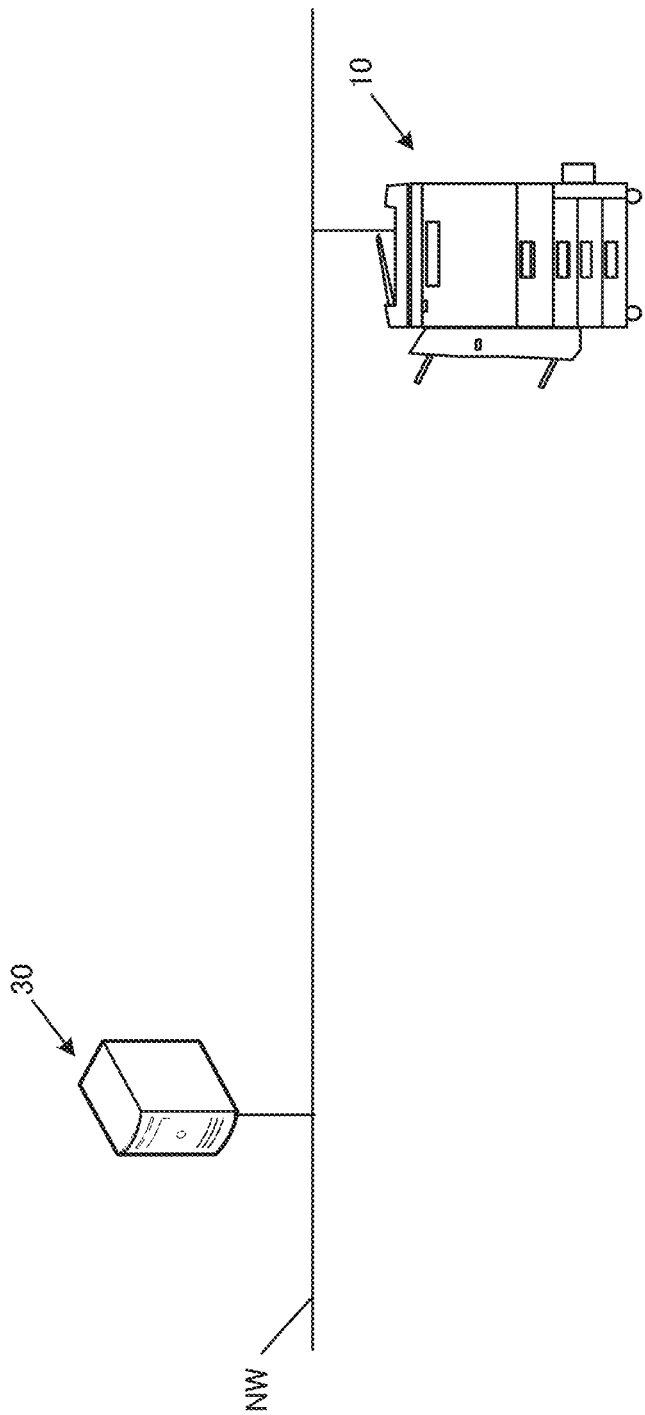
FIG. 1 is a diagram illustrating a connection pattern of a multifunction peripheral according to a first embodiment with respect to a network.

FIG. 1 is a diagram schematically illustrating a configuration of a connection pattern of a multifunction peripheral 10 and a firmware providing device 30. The multifunction peripheral 10 is communicably connected to the firmware providing device 30 via a network NW such as, for example, a local area network (LAN), a wide area network (WAN), the Internet, a telephone line, or a facsimile line. Note that, FIG. 1 illustrates a configuration in which the multifunction peripheral 10 is connected to the same network NW as the firmware providing device 30, but the multifunction peripheral 10 may be connected via a different network NW.

1.1 Functional Configuration 1.1.1 Multifunction Peripheral 10

Figure 2:
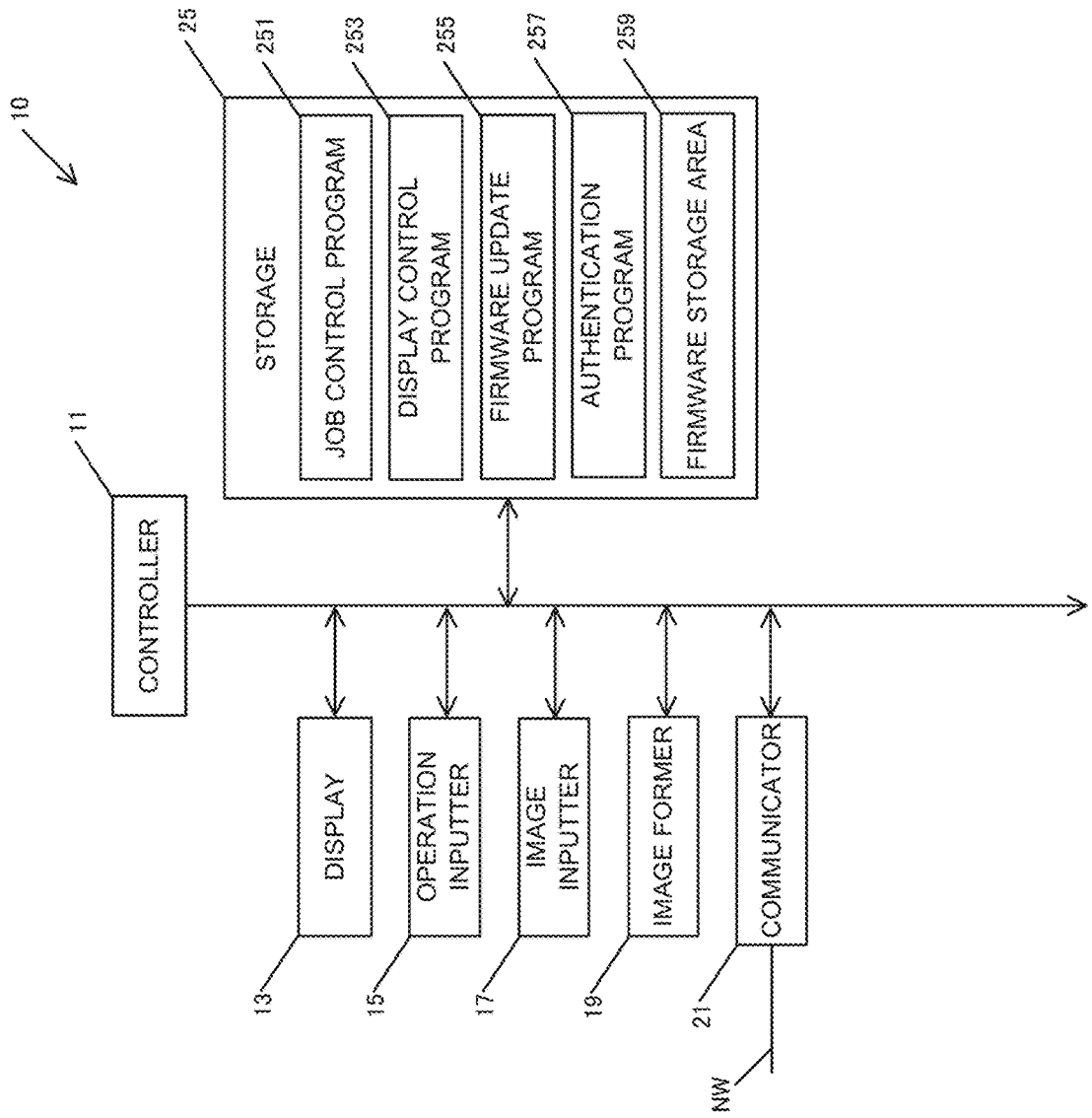
FIG. 2 is a diagram illustrating a functional configuration of the multifunction peripheral according to the first embodiment.

A functional configuration of the multifunction peripheral 10 according to the first embodiment is described with reference to FIG. 2. FIG. 2 is a functional configuration diagram of the multifunction peripheral 10. The multifunction peripheral 10 includes a controller 11, a display 13, an operation inputter 15, an image inputter 17, an image former 19, a communicator 21, and a storage 25.

The controller 11 controls the entirety of the multifunction peripheral 10. The controller 11 is configured of, for example, one or a plurality of arithmetic devices (central processing units (CPUs) or the like). The controller 11 achieves its functions by reading various programs stored in the storage 25, and controlling each device such as the image inputter 17, the image former 19, and the communicator 21.

The display 13 displays various pieces of information to a user or the like. The display 13 as a display device can be configured of, for example, a liquid crystal display (LCD), an organic electro-luminescence (EL) display, or the like. The display 13 displays, based on control by the controller 11 that has read a display control program 253, a home screen, a job execution screen, a system setting screen, an update confirmation screen as a first screen related to whether firmware update can be executed, an authentication information input screen as a second screen for receiving an input of authentication information of an administrator, and the like.

The operation inputter 15 receives an input of information by a user or the like. The operation inputter 15 can be configured of an input device such as hard keys (e.g., a numeric keypad), buttons, and the like. Note that, the operation inputter 15 can be configured as a touch panel that allows an input via the display 13. In this case, as an input method of a touch panel, for example, a general method such as a resistive film method, an infrared method, an electromagnetic induction method, and an electrostatic capacitance method can be employed.

The image inputter 17 can be configured, for example, as a scanner device including an image sensor such as a charge coupled device (CCD) or a contact image sensor (CIS), an automatic document feeder (ADF), a flatbed for placing a document, and the like. In this case, as long as the scanner device has a configuration capable of generating image data by reading a reflected light image from a document image by an image sensor, the configuration is not specifically limited. Note that, the image inputter 17 can also be configured as an interface capable of acquiring an image data file stored in an external storage device (device) such as a universal serial bus (USB) memory, image data received via the network NW, and the like.

The image former 19 forms an image based on image data input from the image inputter 17 on paper or the like as a recording medium. The image former 19 feeds paper from an unillustrated paper feeder, forms an image based on image data on the paper, and then discharges the paper to an unillustrated paper discharger. The image former 19 can be configured of, for example, a laser printer or the like utilizing an electrophotographic method. In this case, the image former 19 performs image formation by using toner supplied from unillustrated toner cartridges associated with toner colors (e.g., cyan, magenta, yellow, and black).

The communicator 21 includes, for example, one or both of a wired interface and a wireless interface necessary for communicating with another device via the network NW such as a LAN, a WAN, the Internet, a telephone line, or a facsimile line.

The storage 25 stores various programs necessary for an operation of the multifunction peripheral 10, and various pieces of data. The storage 25 can be configured of a storage device such as, for example, a random access memory (RAM), a hard disk drive (HDD), a solid state drive (SSD), and a read only memory (ROM).

In the first embodiment, the storage 25 stores a job control program 251, the display control program 253, a firmware update program 255, and an authentication program 257, and secures a firmware storage area 259.

The job control program 251 is a program to be read by the controller 11 in order to perform processing related to each mode such as printing, copying, scanning, faxing, and Internet faxing on a job basis. The controller 11 that has read the job control program 251 executes a job by controlling each device such as the display 13, the operation inputter 15, the image inputter 17, the image former 19, the communicator 21, and a detector 23 to be described later.

The display control program 253 is a program to be read by the controller 11 when display control of a display screen via the display 13 is performed. The controller 11 that has read the display control program 253 displays, on the display 13, for example, a home screen, a job execution screen, a system setting screen, an update confirmation screen related to whether firmware update can be executed, an authentication information input screen for receiving an input of authentication information of an administrator, and the like.

The firmware update program 255 is a program to be read by the controller 11 when a firmware update instruction is received. The controller 11 that has read the firmware update program 255 performs processing related to firmware update, based on the input firmware update instruction. The controller 11 that has read the firmware update program 255 performs, for example, an instruction to display an update confirmation screen related to whether firmware update can be executed, an instruction to display an authentication information input screen for receiving an input of authentication information of the administrator, in a case where firmware update permission is acquired, and the like. Further, the controller 11 performs management of a firmware management table to be described later.

The authentication program 257 is a program to be read by the controller 11 when authenticating a user who tries to log in to the multifunction peripheral 10, or an administrator who has an authority to manage the apparatus. In a case where a user authentication function is enabled, the controller 11 that has read the authentication program 257 displays an unillustrated authentication screen on the display 13, and receives an input of authentication information related to user authentication or administrator authentication. For example, in a case where an authentication condition is a combination of a user name and a password, the controller 11 can store in advance a user name and a password related to authentication in association with each other, and perform user authentication or administrator authentication by collating the user name and the password input via the authentication screen. Note that, authentication can be performed, in addition to knowledge authentication in which a user name and a password are combined, for example, by belongings authentication using a token, a key, an integrated circuit (IC) card, a smartphone, or the like, biometric authentication such as face authentication or fingerprint authentication, or the like. Note that, the controller 11 can receiving settings on validity/invalidity of the authentication function via a system setting screen or the like.

The firmware storage area 259 is a storage area that stores a firmware management table 2590 in which firmware related to update, and an update log related to firmware update are managed. Herein, the firmware management table 2590 is described with reference to FIG. 3.

Figure 3:
FIG. 3 is a diagram illustrating a configuration of a data structure of a firmware management table.

FIG. 3 is a diagram illustrating a configuration example of a data structure of the firmware management table 2590. The firmware management table 2590 includes, as management items, Model Name, Serial Number, FW Update Name, Update Scheduled, Status, Status Changed, and FW Version.

Model Name represents the model name (oo-0001) of the multifunction peripheral 10. Serial Number represents the serial number (9504615800) of the multifunction peripheral 10. FW Update Name represents the name (abcdefghijk) of the firmware related to update. Update Scheduled represents the update date and time (Jun. 7, 2022 5:00 PM) of the set firmware update. Status represents an update result (Success). Status Changed represents the date and time (Jun. 7, 2022 5:19 PM) when firmware update is completed, and Status is updated. FW Version represents the version (00P20.G1) of the firmware related to update.

Note that, management items to be managed in the firmware management table 2590 are not limited to the above items, and settings can be changed as necessary. When the controller 11 that has read the firmware update program 255 receives a firmware update instruction, the controller 11 can determine whether firmware for update is appropriate by referring to the firmware management table 2590, for example, by checking the name, the version, and the like of the firmware to be updated. For example, when the firmware for update is not appropriate as a result of reference to the firmware management table 2590, the controller 11 can display, on the display 13, an error message indicating that the firmware for update is not appropriate, notify the providing destination (firmware providing device 30) of the firmware for update that the firmware for update is not appropriate, make a request to acquire appropriate firmware for update, and the like.

1.1.2 Firmware Providing Device 30

The firmware providing device 30 is an external terminal device to be used by an operator, for example, such as a manufacturer, a dealer, or a service provider that undertakes management and maintenance of the multifunction peripheral 10, and capable of outputting an instruction to update firmware, regarding providing the firmware for update.

Figure 4:
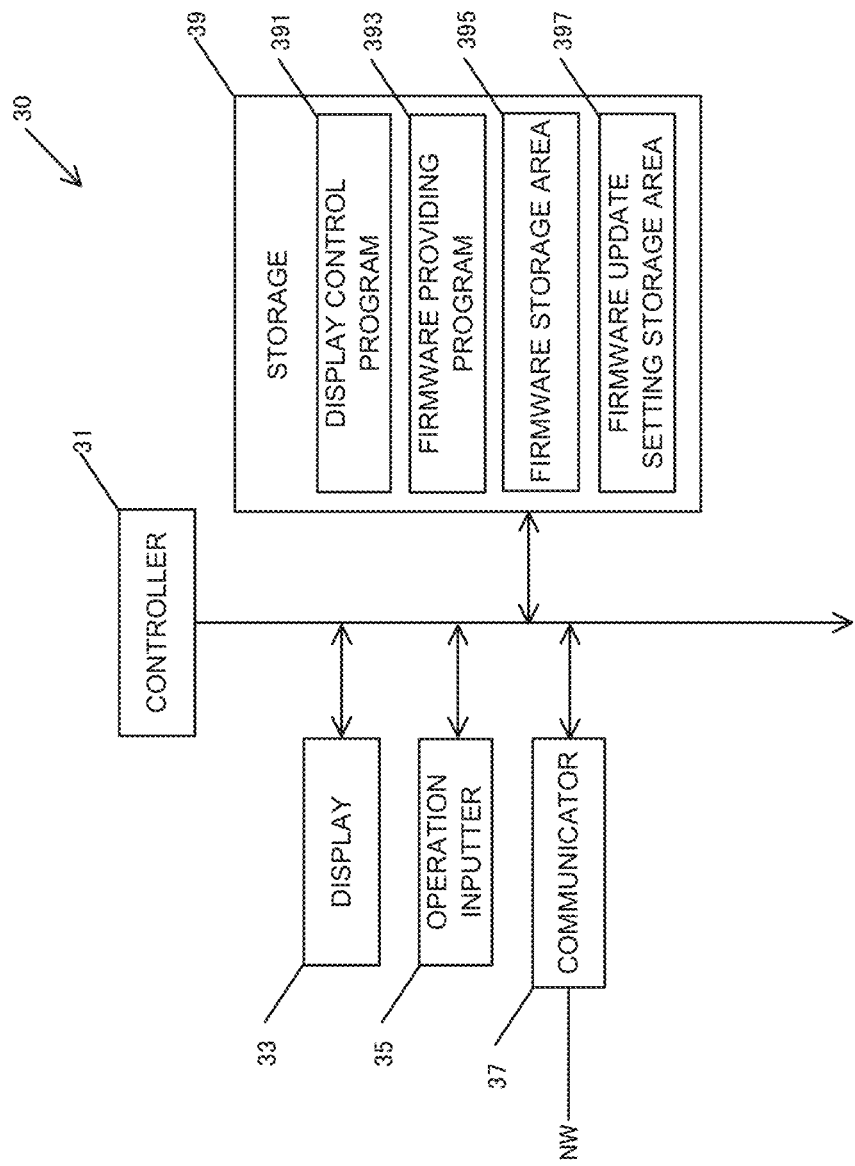
FIG. 4 is a diagram illustrating a functional configuration of a firmware providing device according to the first embodiment.

FIG. 4 is a functional configuration diagram of the firmware providing device 30. The firmware providing device 30 includes a controller 31, a display 33, an operation inputter 35, a communicator 37, and a storage 39.

The controller 31 controls the entirety of the firmware providing device 30. The controller 31 is configured of, for example, one or a plurality of arithmetic devices (CPUs or the like). The controller 31 achieves each function by reading and executing various programs stored in the storage 39.

The display 33 displays various pieces of information to the user or the like. The display 33 can be configured of, for example, an LCD, an organic EL display, a micro LED display, a mini LED display, or the like.

The operation inputter 35 is an input device that receives an input of information from a user or the like. The operation inputter 35 may be configured of, for example, an input device such as a keyboard, a mouse, or a touch panel.

The communicator 37 includes, for example, one or both of a wired communication interface and a wireless communication interface necessary for communicating with another device via the network NW such as a LAN, a WAN, the Internet, a telephone line, or a facsimile line. The communicator 37 can communicate with the multifunction peripheral 10, and provide a firmware update instruction, a firmware body for update, and the like.

The storage 39 stores various programs necessary for an operation of the firmware providing device 30, and various pieces of data. The storage 39 can be configured of, for example, a storage device such as a RAM, an HDD, an SSD, or a ROM.

In the first embodiment, the storage 39 stores a display control program 391 and a firmware providing program 393, and secures a firmware storage area 395 and a firmware update setting storage area 397.

The display control program 391 is a program to be read by the controller 31 when display control of a display screen via the display 33 is performed. The controller 31 that has read the display control program 391 displays, for example, a firmware update setting screen and the like to be described later.

The firmware providing program 393 is a program to be read by the controller 31 when firmware for update is provided. The controller 31 that has read the firmware providing program 393 refers to a firmware update setting table to be described later, and outputs a firmware update instruction to the multifunction peripheral 10 at a preset update date and time. Further, the controller 31 that has read the firmware providing program 393 outputs the firmware for update to the multifunction peripheral 10.

The firmware storage area 395 is a storage area that stores firmware for update. Note that, the firmware for update may be provided from an external device such as a server other than the firmware providing device 30.

The firmware update setting storage area 397 is a storage area that stores a firmware update setting table 3970 in which firmware update settings are managed. Herein, the firmware update setting table 3970 is described with reference to FIG. 5.

FIG. 5 is a diagram illustrating a configuration example of a data structure of the firmware update setting table 3970. The firmware update setting table 3970 includes, as management items, Model Name, Serial Number, FW Update Name, Update Scheduled, Status, Status Changed, and FW Version.

Model Name represents the model name of the multifunction peripheral 10 to be managed as a providing destination of firmware for update. Serial Number represents the serial number of the multifunction peripheral 10 to be managed as the providing destination of the firmware for update. FW Update Name represents the name of the firmware related to update. Update Scheduled represents the update date and time of the set firmware update. Status represents an update result. Status Changed represents the date and time when update of the firmware is completed, and Status is updated. FW Version represents the version of the firmware related to update.

For example, firmware update settings identified by Model Name "○○-0001", and Serial Number "9504615800" are firmware update settings for the multifunction peripheral 10. Note that, in a case where the firmware providing device 30 manages firmware update for an image forming apparatus other than the multifunction peripheral 10, the firmware providing device 30 can manage setting information similar to the firmware update settings for the multifunction peripheral 10. For example, firmware update settings identified by Model Name "○○-0003" and Serial Number "3322445566" are firmware update settings for an image forming apparatus identified by Model Name "○○-0003" and Serial Number "3322445566". In the firmware update settings, the update date and time of the firmware are set to the update date and time (Jun. 10, 2022 5:00 PM), and the settings represent a state in which firmware update is suspended until the update date and time arrives (Status "Waiting").

1.2 Flow of Processing 1.2.1 Processing of Multifunction Peripheral 10

Figure 6:
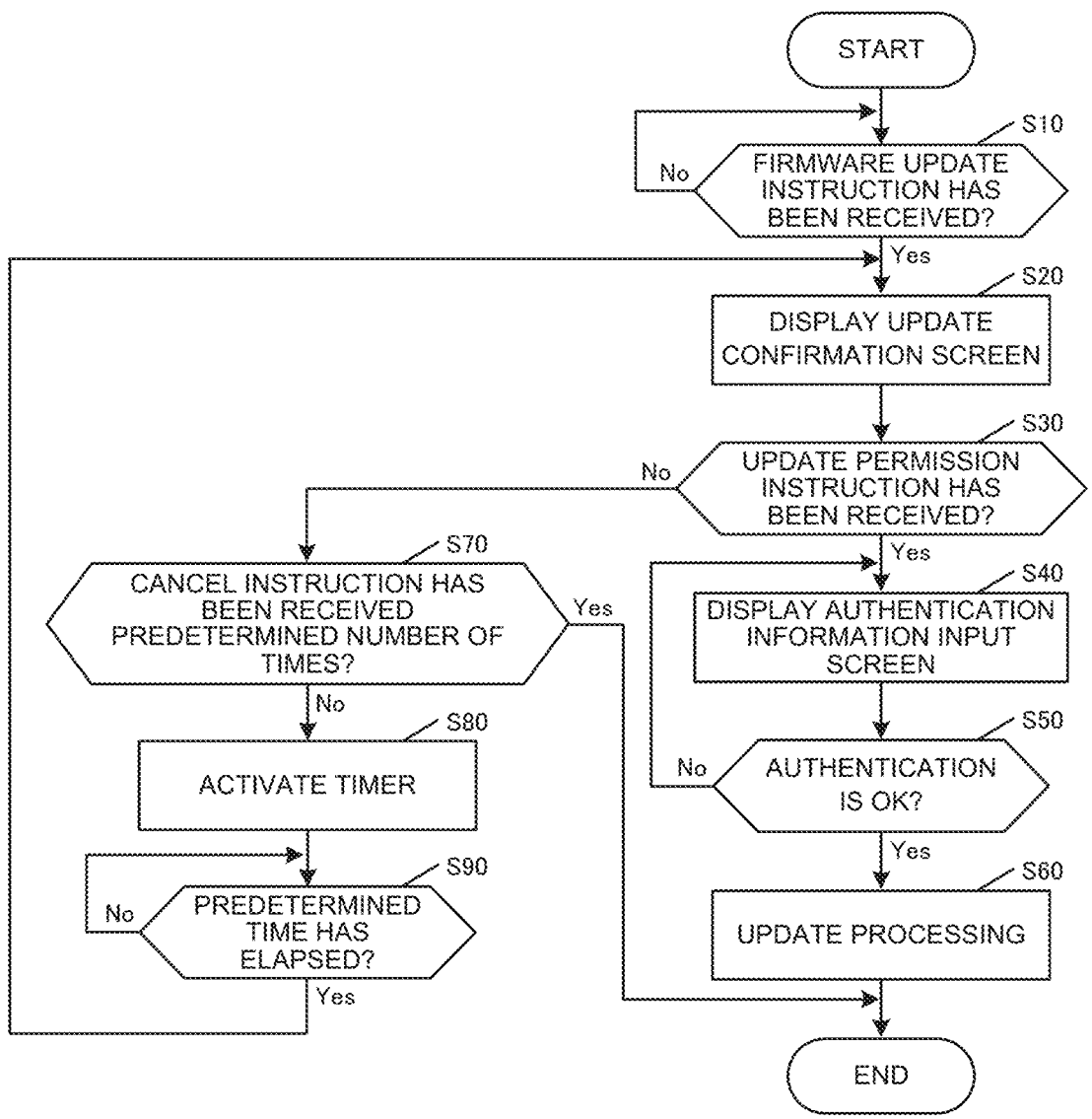
FIG. 6 is a flowchart illustrating a flow of processing according to the first embodiment.

Next, a flow of processing according to the first embodiment is described. FIG. 6 is a flowchart illustrating processing related to firmware update in the multifunction peripheral 10. The processing described in FIG. 6 is processing to be performed by mainly reading the display control program 253, the firmware update program 255, the authentication program 257, and the like by the controller 11.

First, the controller 11 determines whether a firmware update instruction has been received from the firmware providing device 30 (step S10). In a case where it is determined that the firmware update instruction has been received, the controller 11 displays, on the display 13, an update confirmation screen as a first screen (step S10; Yes→step S20). Note that, in a case where it is determined that the firmware update instruction has not been received, the controller 11 waits until the update instruction is received (step S10; No).

Subsequently, the controller 11 determines whether a firmware update permission instruction has been received from the user via the update confirmation screen (step S30). In a case where it is determined that the firmware update permission instruction has been received, the controller 11 displays, on the display 13, an authentication information input screen as a second screen for receiving an input of authentication information of the administrator (step S30; Yes→step S40). Then, the controller 11 determines the input authentication information of the administrator. When authentication of the administrator is successful, the controller 11 performs update processing (step S50; Yes→step S60). Note that, in a case where authentication of the input authentication information of the administrator has failed, the controller 11 continues to display the authentication information input screen (step S50; No→step S40).

In a case where it is determined that firmware update is not permitted (cancelled), the controller 11 determines whether the number of times of cancellation has reached a predetermined number of times (not permitted a predetermined number of times) (step S30; No→step S70).

In a case where it is determined that the number of times of cancellation of firmware update has reached the predetermined number of times, the controller 11 finishes the processing without updating the firmware (step S70; Yes→end). On the other hand, in a case where it is determined that the number of times of cancellation of firmware update has not reached the predetermined number of times, the controller 11 activates an unillustrated timer (step S70; No→step S80). Then, the controller 11 determines whether a predetermined time has elapsed from display of the update confirmation screen (step S90).

In a case where it is determined that the predetermined time has elapsed from display of the update confirmation screen, the controller 11 returns the processing to step S20, and displays the update confirmation screen again (step S90; Yes→step S20). Note that, in a case where it is determined that the predetermined time has not elapsed from display of the update confirmation screen, the controller 11 continues time measurement by the timer (step S90; No).

1.2.2 Processing of Firmware Providing Device 30

Figure 7:
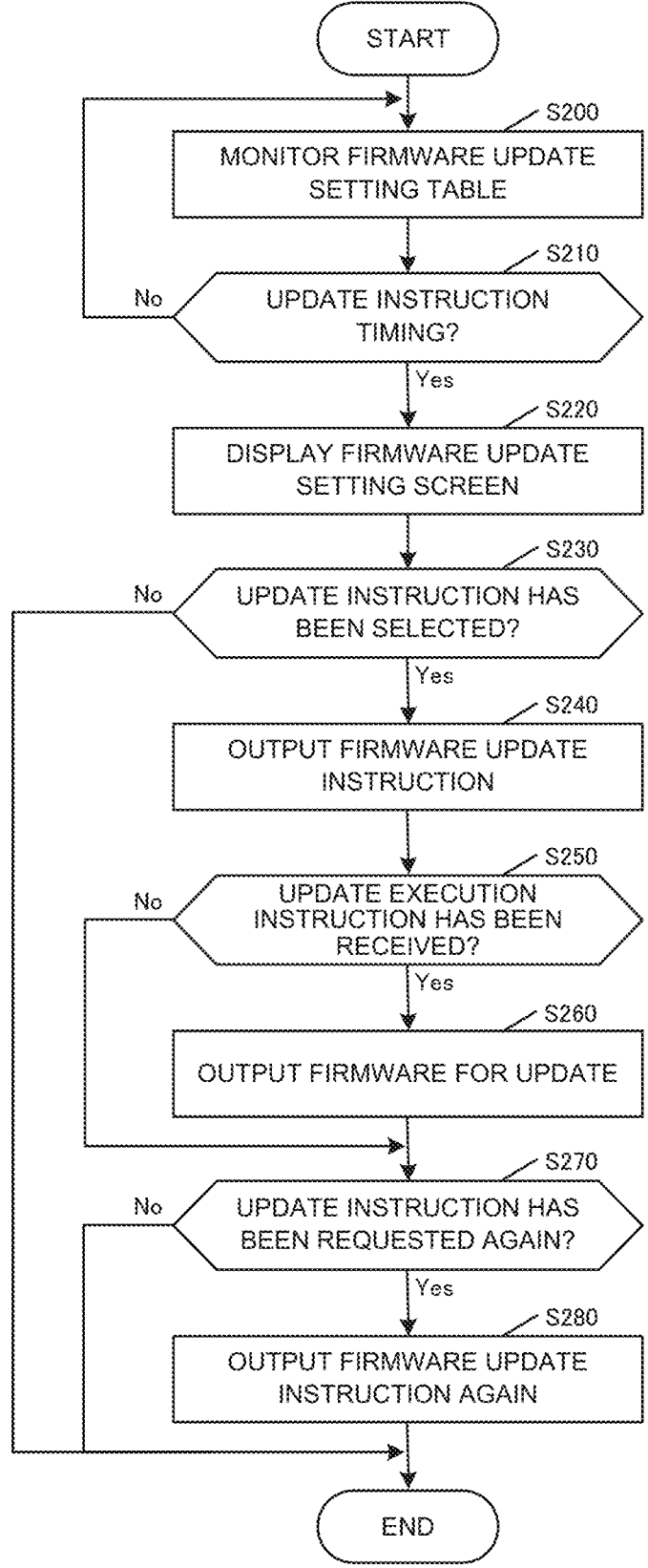
FIG. 7 is a flowchart illustrating a flow of processing according to the first embodiment.

Next, a flow of processing in the firmware providing device 30 is described with reference to a flowchart in FIG. 7. The processing described in FIG. 7 is processing to be performed by mainly reading the display control program 391, the firmware providing program 393, and the like by the controller 31.

The controller 31 monitors the firmware update setting table 3970, and determines whether a preset firmware update instruction timing has arrived (step S200→step S210). In a case where it is determined that the firmware update instruction timing has arrived, the controller 31 displays a firmware update setting screen on the display 33 (step S210; Yes→step S220). Note that, in a case where it is determined that the firmware update instruction timing has not arrived, the controller 31 continues to monitor the firmware update setting table 3970 (step S210; No→step S200).

The controller 31 determines whether a firmware update instruction has been selected via the displayed firmware update setting screen (step S230). In a case where it is determined that the firmware update instruction has been selected, the controller 31 outputs the firmware update instruction to the multifunction peripheral 10 (step S230; Yes→step S240). Note that, in a case where it is determined that the firmware update instruction has not been selected, the controller 31 finishes the processing (step S230; No→end).

Subsequently, the controller 31 determines whether a firmware update execution instruction has been received from the multifunction peripheral 10, based on the output firmware update instruction (step S250). In a case where it is determined that the firmware update execution instruction has been received, the controller 31 outputs the firmware for update to the multifunction peripheral 10 (step S250; Yes→step S260). On the other hand, in a case where it is determined that the firmware update execution instruction has not been received, the controller 31 shifts the processing to step S270 (step S250; No→step S270).

The controller 31 determines whether a re-request for a firmware update instruction has been received from the multifunction peripheral 10 (step S270). In a case where it is determined that the re-request for a firmware update instruction has been received, the controller 31 outputs the firmware update instruction again, and finishes the processing (step S270; Yes→step S280). On the other hand, in a case where it is determined that the re-request for a firmware update instruction has not been received, the controller 31 finishes the processing (step S270; No→end).

1.3 Operation Example

Figure 8:
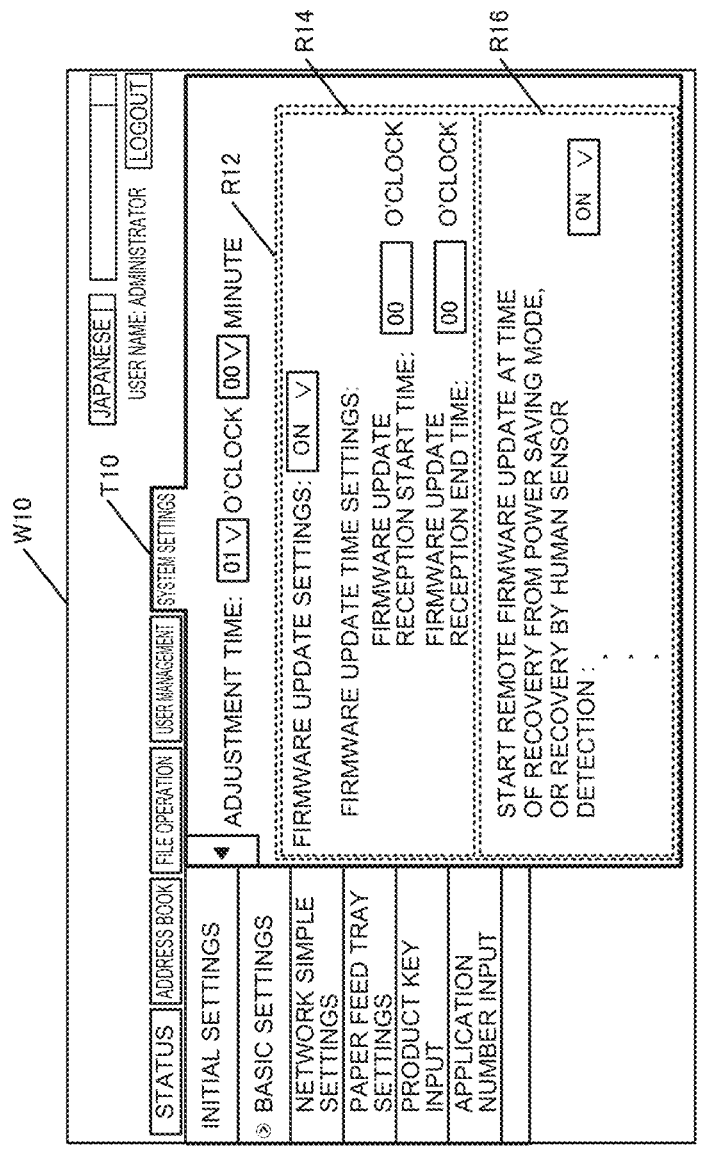
FIG. 8 is a diagram illustrating an operation example according to the first embodiment.

Next, an operation example according to the first embodiment is described. FIG. 8 is a diagram illustrating a configuration example of an information display setting screen W10 in the multifunction peripheral 10.

The information display setting screen W10 includes a system setting tab T10. The system setting tab T10 receives display of setting information related to the entirety of a system of the multifunction peripheral 10, and an input of a setting value. The system setting tab T10 includes a firmware update setting area R12.

The firmware update setting area R12 includes a basic setting area R14 and a detail setting area R16. The basic setting area R14 includes a firmware update setting pull-down menu, and firmware update time settings.

The firmware update setting pull-down menu receives settings on validity/invalidity of firmware update. In a case where the setting value of the firmware update setting pull-down menu is "ON", firmware update is enabled. On the other hand, when the setting value is "OFF", firmware update is disabled.

The firmware update time settings receive settings on a reception time zone of a firmware update instruction. The controller 11 receives a firmware update instruction during a period from a reception start time set at a firmware update reception start time until a reception end time set at a firmware update reception end time.

Since a setting content of the detail setting area R16 is described in a fifth embodiment, description thereof is omitted herein.

Figure 9:
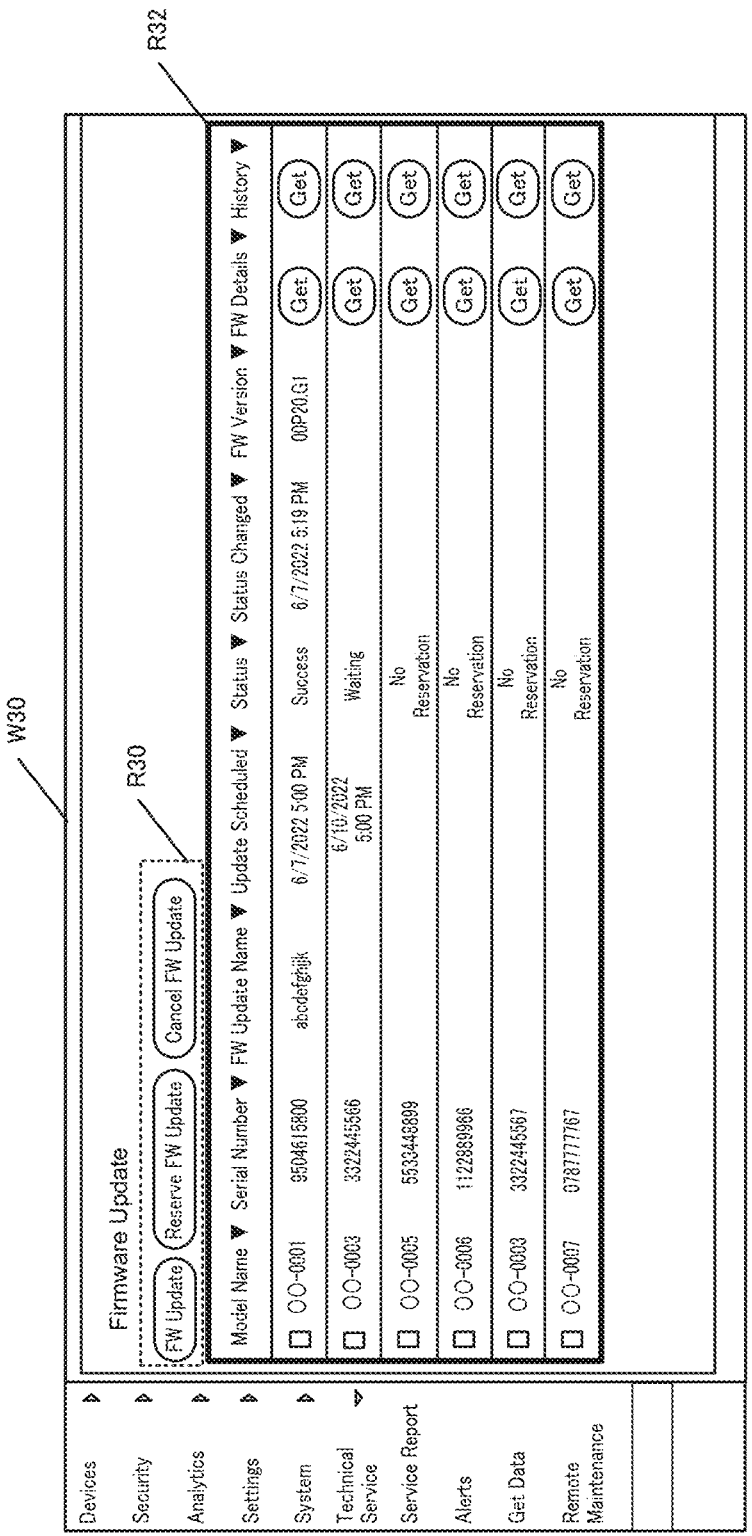
FIG. 9 is a diagram illustrating an operation example according to the first embodiment.

FIG. 9 is a diagram illustrating a configuration example of a firmware update setting screen W30 to be displayed on the display 33 by the controller 31 of the firmware providing device 30. The firmware update setting screen W30 is a setting screen that receives settings related to firmware update by the operator of the firmware providing device 30.

The firmware update setting screen W30 includes a firmware update operation selection area R30, and a firmware update setting display area R32.

The firmware update operation selection area R30 includes an FW Update button, a Reserve FW Update button, and a Cancel FW Update button. The FW Update button is a button that receives an output instruction for firmware update. The Reserve FW Update button is a button that receives a reservation instruction for firmware update. The Cancel FW Update button is a button that receives an instruction to cancel firmware update.

The operator of the firmware providing device 30 can output an instruction to perform processing related to firmware update, or cancel the processing by selecting various buttons provided in the firmware update operation selection area R30.

The firmware update setting display area R32 is a display area that displays a setting content in the firmware update setting table 3970. The operator of the firmware providing device 30 can perform a firmware update instruction or the like to the multifunction peripheral 10 to be managed by confirming a display content in the firmware update setting display area R32.

Figure 10:
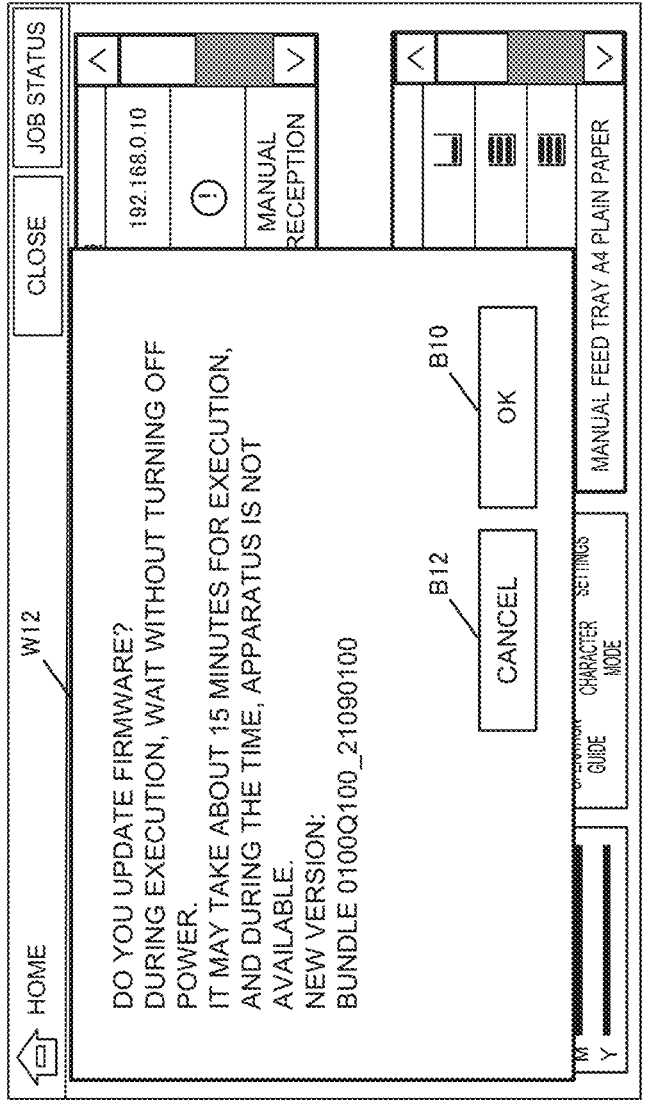
FIG. 10 is a diagram illustrating an operation example according to the first embodiment.

FIG. 10 is a diagram illustrating a display configuration example of an update confirmation screen W12 as a first screen to be displayed on the display 13, in a case where it is determined that the controller 11 has received a firmware update instruction in step S10 in FIG. 6 (corresponding to the processing of step S20 in FIG. 6).

The update confirmation screen W12 includes a message asking whether firmware update can be executed, an OK button B10, and a cancel button B12. FIG. 10 is an example in which the version (name) of firmware related to update is displayed, in addition to a content "Do you update firmware? During execution, wait without turning off power. It may take about fifteen minutes for execution, and during the time, the apparatus is not available", as a content asking whether firmware update can be performed.

The OK button B10 is a button that receives selection by the user, in a case where firmware update is permitted. The cancel button B12 is a button that receives selection by the user, in a case where firmware update is not permitted. When the OK button B10 is selected by the user, the controller 11 displays, on the display 13, an authentication information input screen, as a second screen illustrated in the next drawing, which receives an input of authentication information of the administrator.

Figure 11:
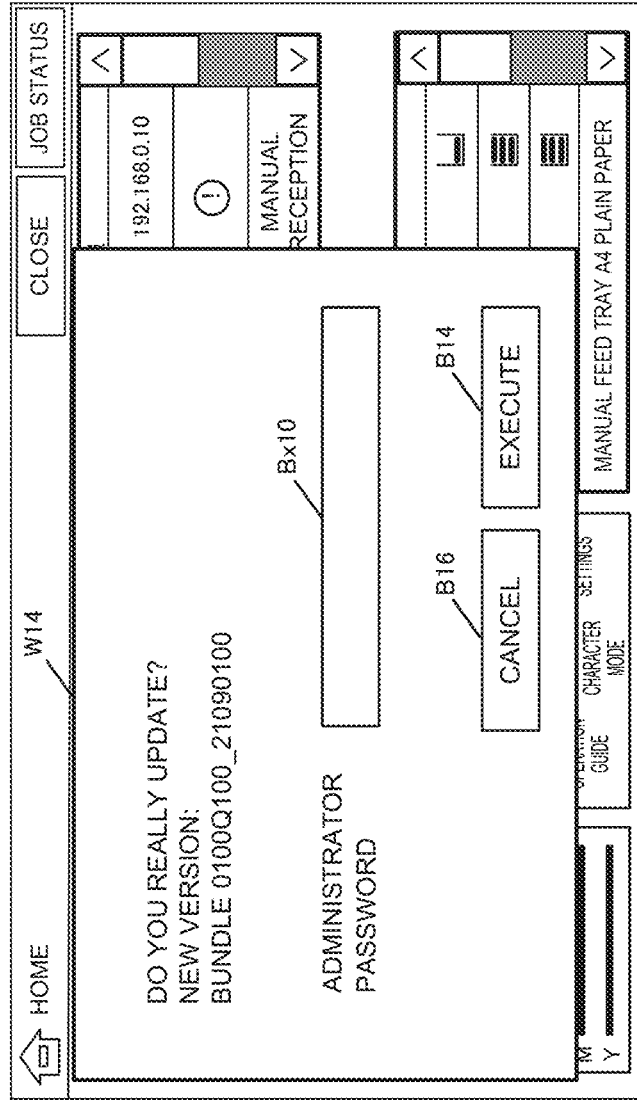
FIG. 11 is a diagram illustrating an operation example according to the first embodiment.

FIG. 11 is a diagram illustrating a display configuration example of an authentication information input screen W14 that receives an input of authentication information of the administrator. The authentication information input screen W14 includes a message prompting final confirmation related to firmware update, a password input box Bx10, an execution button B14, and a cancel button B16.

FIG. 11 is an example in which the version (name) related to firmware update is displayed, in addition to a content "Do you really update?", as a content prompting final confirmation related to firmware update.

The password input box Bx10 is an input box that receives an input of a password as authentication information of the administrator. The controller 11 performs firmware update processing depending on whether authentication based on a password of the administrator input in the password input box Bx10 is successful.

The execution button B14 is a button that receives an execution instruction related to firmware update by the user after the password of the administrator is input in the password input box Bx10. When receiving selection of the execution button B14 by the user, the controller 11 performs authentication processing based on the password of the administrator, and when the authentication is successful, the controller 11 performs firmware update processing. The cancel button B16 is a button that receives selection by the user, in a case where firmware update is cancelled.

In the first embodiment, when an input of a firmware update instruction is received, the update confirmation screen W12 for firmware is displayed on the display 13 of the multifunction peripheral 10. Then, when firmware update is permitted via the update confirmation screen W12, the controller 11 displays the authentication information input screen W14 that receives an input of authentication information of the administrator. A configuration as described above allows the user of the multifunction peripheral 10 to recognize execution of firmware update via the update confirmation screen W12. Further, requesting an input of authentication information of the administrator (administrator's password) for firmware update enables to clarify authority related to firmware update. Further, providing a cancel button on both of the update confirmation screen W12 and the authentication information input screen W14 allows the user to cancel firmware update. A configuration as described above enables to prevent lowering of operability and convenience such that, for example, a job in execution is interrupted by firmware update, or a job cannot be executed (operation of the multifunction peripheral 10 cannot be performed) at a timing desired by the user.

As described above, according to the first embodiment, it is possible to provide a multifunction peripheral capable of improving operability and convenience of the user by displaying a confirmation screen related to whether firmware update can be executed on an operation screen included in the multifunction peripheral.

2. Second Embodiment

A second embodiment is an embodiment in which display of an update confirmation screen as a first screen is restricted, in a case where an operation state of a multifunction peripheral corresponds to a specific operation state when a firmware update instruction is input.

2.1 Functional Configuration

Figure 12:
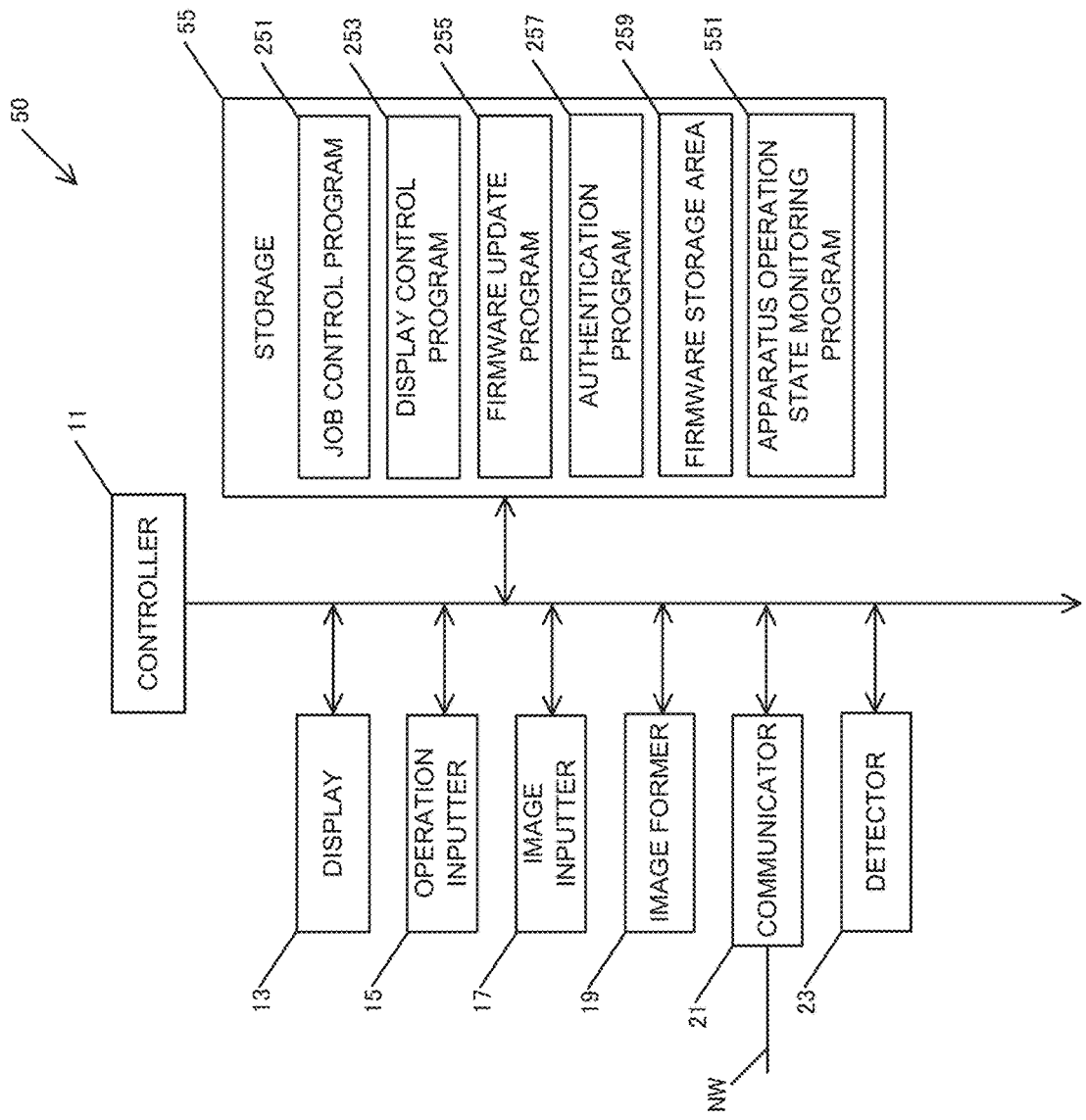
FIG. 12 is a diagram illustrating a functional configuration of a multifunction peripheral according to a second embodiment.

FIG. 12 is a functional configuration diagram of a multifunction peripheral 50 according to the second embodiment. The multifunction peripheral 50 has a configuration in which a detector 23 is added to the configuration of the multifunction peripheral 10 according to the first embodiment, and the storage 25 is replaced with a storage 55. The same configuration as the configuration of the multifunction peripheral 10 is denoted by the same reference sign, and different portions from those of the multifunction peripheral 10 are described.

The detector 23 includes a human sensor for detecting a user around the multifunction peripheral 50, in addition to various sensors related to image formation, such as an environment sensor including a temperature and humidity sensor for monitoring an operation state of the multifunction peripheral 50, and a medium position sensor for detecting a position of a recording medium in an image inputter 17 or an image former 19. The human sensor is not specifically limited, but an infrared sensor, a sound sensor, an ultrasonic sensor, a touch sensor, and the like are exemplified.

In the second embodiment, the storage 55 stores a job control program 251, a display control program 253, a firmware update program 255, an authentication program 257, and an apparatus operation state monitoring program 551, and secures a firmware storage area 259.

The apparatus operation state monitoring program 551 is a program to be read by a controller 11 when an apparatus operation state of the multifunction peripheral 50 is recognized. The controller 11 that has read the apparatus operation state monitoring program 551 determines whether the multifunction peripheral 50 is in a specific operation state, based on a detection result output from the detector 23.

Since a functional configuration of a firmware providing device 30 according to the second embodiment may be made the same as that of the first embodiment, description thereof is omitted herein.

2. 2 Flow of Processing

Figure 13:
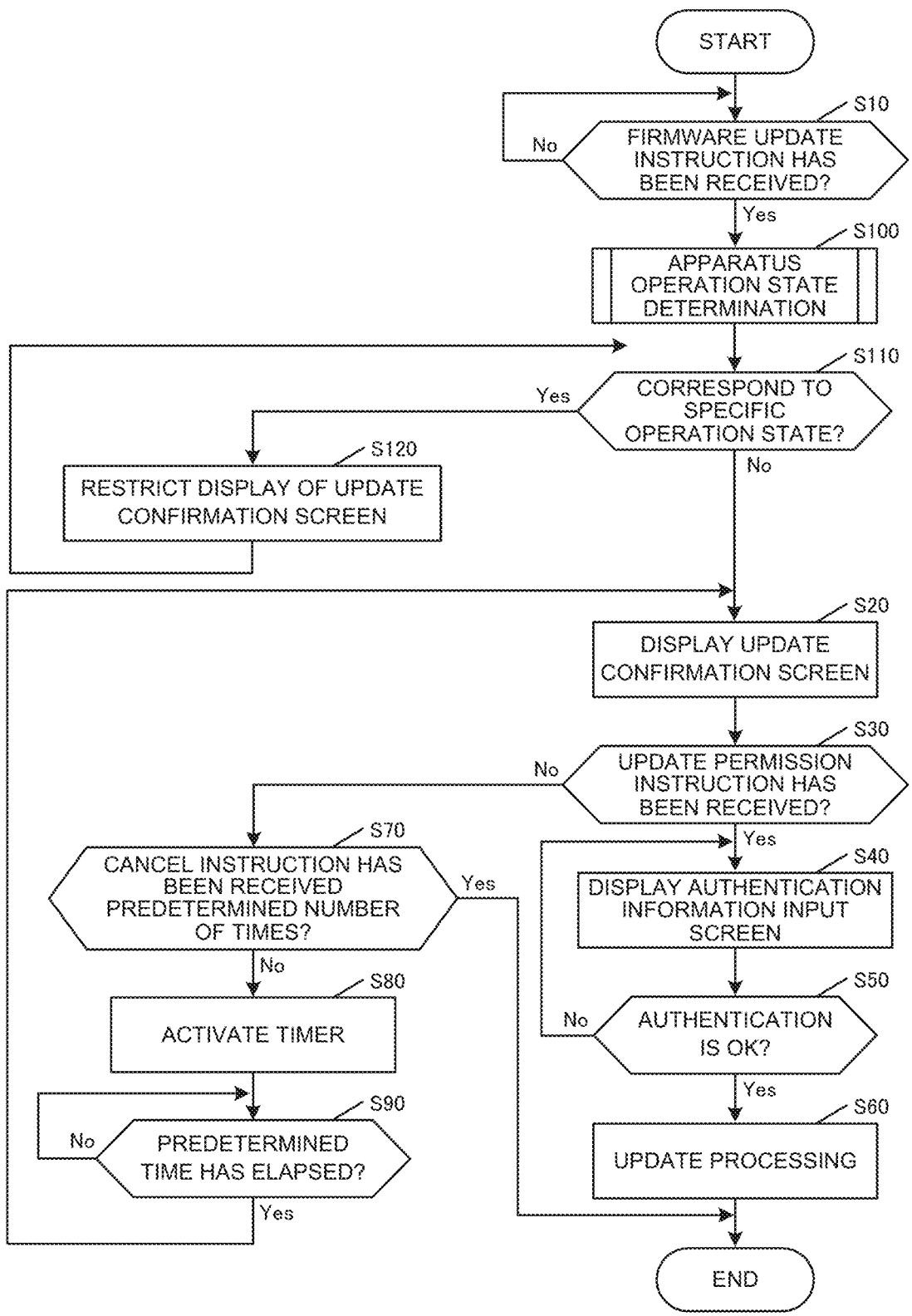
FIG. 13 is a flowchart illustrating a flow of processing according to the second embodiment.

Next, a flow of processing according to the second embodiment is described. FIG. 13 is a flowchart illustrating processing related to firmware update in the multifunction peripheral 50. The processing described in FIG. 13 is processing to be performed by mainly reading the display control program 253, the firmware update program 255, the authentication program 257, the apparatus operation state monitoring program 551, and the like by the controller 11. Further, the processing illustrated in FIG. 13 is processing in which an operation state of the multifunction peripheral 50 is determined between step S10 and step S20 illustrated in FIG. 6. Therefore, the same processing is denoted by the same step number, and description thereof is omitted.

In a case where it is determined that a firmware update instruction has been received, the controller 11 determines an operation state of the multifunction peripheral 50 (step S10; Yes→step S100). Then, in a case where it is determined that the operation state of the multifunction peripheral 50 corresponds to a specific operation state, the controller 11 restricts display of an update confirmation screen (step S110; Yes→step S120). Note that, the controller 11 restricts display of the update confirmation screen until the operation state of the multifunction peripheral 50 does not correspond to the specific operation state. Herein, "restrict display" according to the present disclosure includes, in addition to a configuration in which the update confirmation screen is not displayed on a display 13 (non-display control), a configuration in which an update confirmation screen itself is not generated, a configuration in which an update confirmation screen is displayed in a case where an instruction to select a specific icon is received, and the like. As far as display of a display content (e.g., a job execution screen, a home screen, and the like) on the display 13 is not obstructed by display of the update confirmation screen, the configuration is not specifically limited.

On the other hand, in a case where it is determined that the operation state of the multifunction peripheral 50 does not correspond to the specific operation state, the controller 11 displays the update confirmation screen on the display 13 (step S110; No→step S20).

Figure 14:
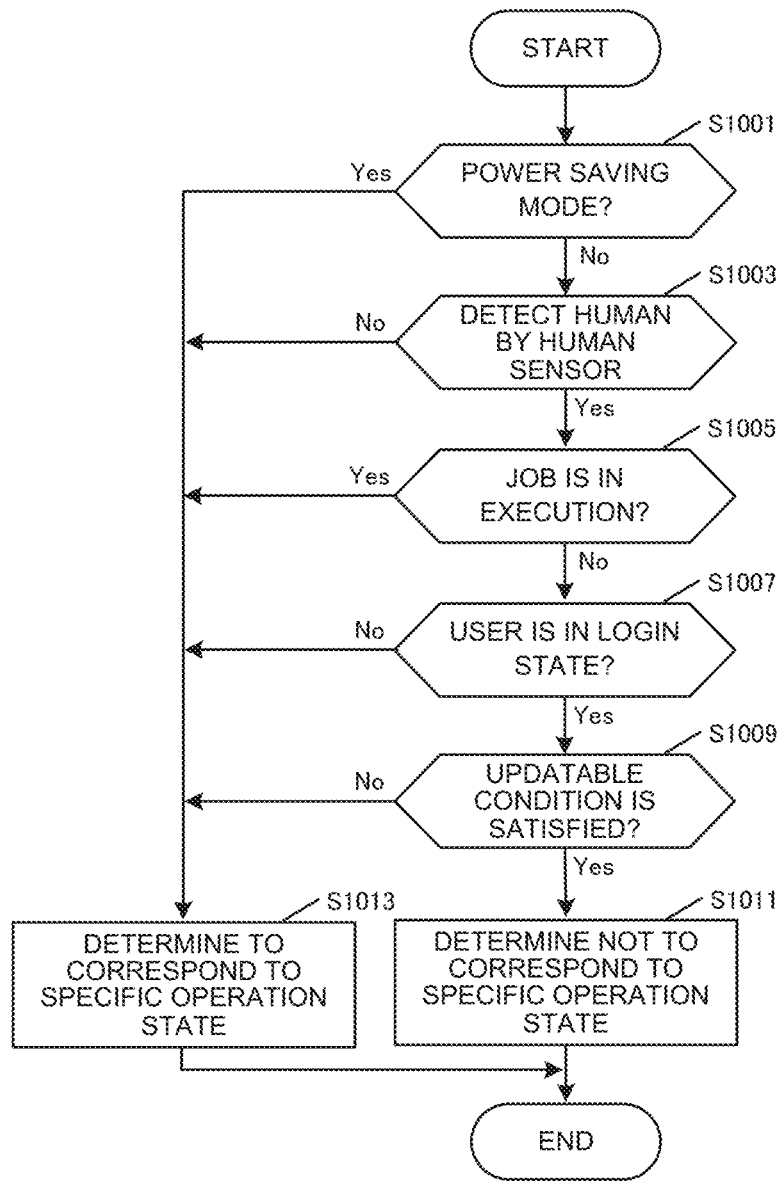
FIG. 14 is a flowchart illustrating a flow of processing according to the second embodiment.

Next, determination processing of an apparatus operation state in step S100 in FIG. 13 is described with reference to a flowchart in FIG. 14. When determination processing of an apparatus operation state is started, the controller 11 determines whether the operation state of the multifunction peripheral 50 is in a power saving mode such as an energy saving mode or a nighttime mode (step S1001). In a case where it is determined that the operation state of the multifunction peripheral 50 is in the power saving mode, the controller 11 determines that the multifunction peripheral 50 is in a specific operation state, and finishes the processing (step S1001; Yes→step S1013).

In a case where it is determined that the operation state of the multifunction peripheral 50 is not in the power saving mode, the controller 11 determines whether a human sensor detects a person around the multifunction peripheral 50 (step S1001; No→step S1003). In a case where it is determined that the human sensor does not detect a person around the multifunction peripheral 50, the controller 11 determines that the multifunction peripheral 50 is in a specific operation state, and finishes the processing (step S1003; No→step S1013).

In a case where it is determined that the human sensor has detected a person around the multifunction peripheral 50, the controller 11 determines whether a job is being executed (step S1003; Yes→step S1005).

In a case where it is determined that a job is being executed, the controller 11 determines that the multifunction peripheral 50 is in a specific operation state, and finishes the processing (step S1005; Yes→step S1013).

In a case where it is determined that a job is not being executed, the controller 11 determines whether the user has logged in to the multifunction peripheral 50 (step S1005; No→step S1007). In a case where it is determined that the user has not logged in to the multifunction peripheral 50, the controller 11 determines that the multifunction peripheral 50 is in a specific operation state, and finishes the processing (step S1007; No→step S1013).

In a case where it is determined that the user has logged in to the multifunction peripheral 50, the controller 11 determines whether firmware related to update satisfies an updatable condition (step S1007; Yes→step S1009). In a case where it is determined that firmware related to update does not satisfy the updatable condition, the controller 11 determines that the multifunction peripheral 50 is in a specific operation state, and finishes the processing (step S1009; No→step S1013).

In a case where it is determined that firmware related to update satisfies the updatable condition, the controller 11 determines that the multifunction peripheral 50 is not in a specific operation state, and finishes the processing (step S1009; Yes→step S1011). Note that, in FIG. 14, pieces of processing from step S1001 to step S1009 are illustrated in series, but the processing described in FIG. 14 is not limited to the flow, and pieces of processing from step S1001 to step S1009 may be parallel processing.

2. 3 Operation Example

Figure 15:
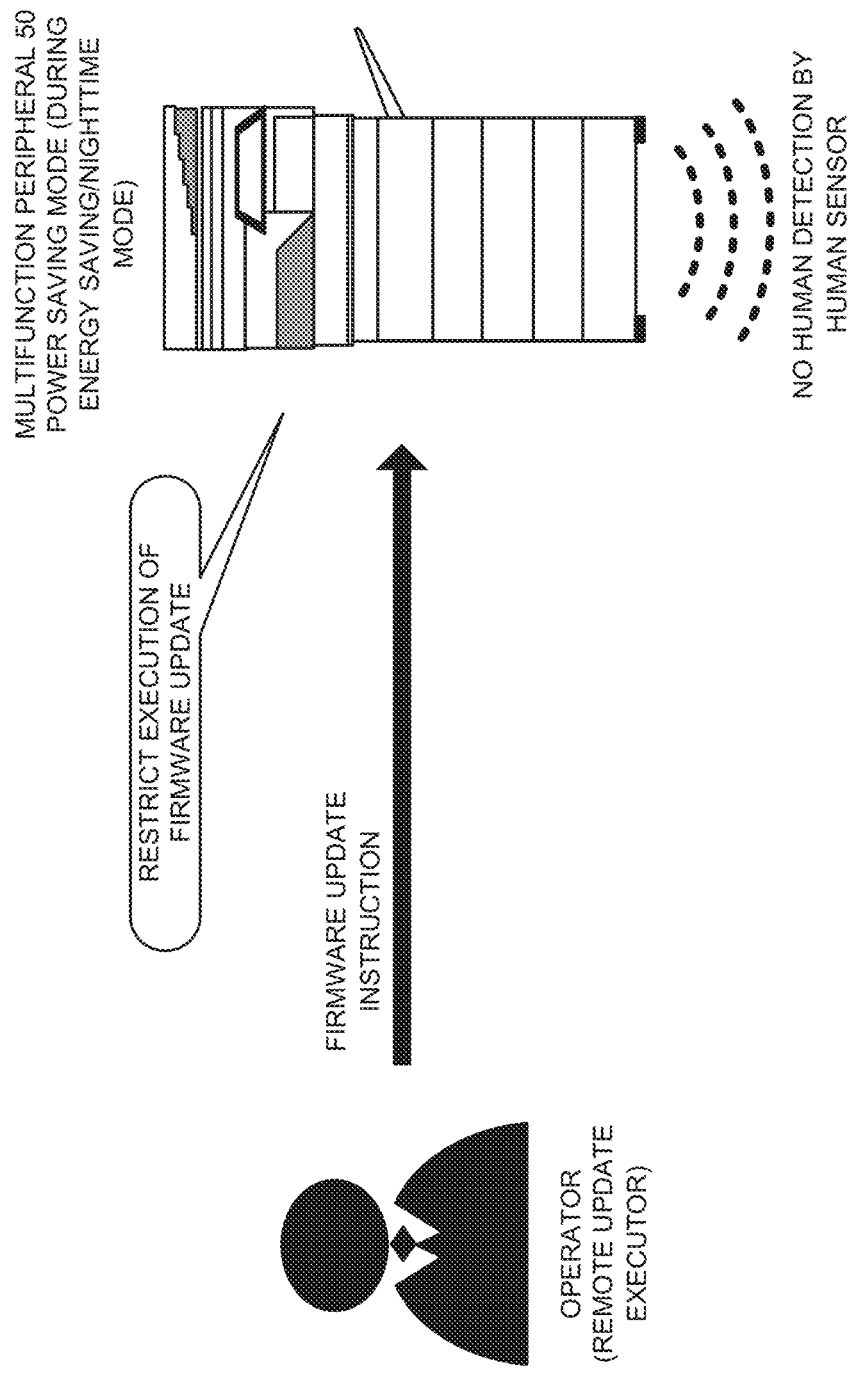
FIG. 15 is a diagram illustrating an operation example according to the second embodiment.

Next, an operation example according to the second embodiment is described. FIG. 15 is a diagram schematically illustrating, as an example in which an operation state of the multifunction peripheral 50 corresponds to a specific operation state, an operation related to firmware update in a case where an operation state of the multifunction peripheral 50 is in a power saving mode such as an energy saving mode or a nighttime mode, or a person around the multifunction peripheral 50 is not detected by a human sensor.

For example, in FIG. 15, the firmware providing device 30 issues a firmware update instruction to the multifunction peripheral 50, based on an instruction from the operator. However, in a case where the multifunction peripheral 50 is in a power saving mode such as an energy saving mode or a nighttime mode, or in a case where a human sensor does not detect a person around the multifunction peripheral 50, display of the update confirmation screen related to firmware update is restricted.

Figure 16:
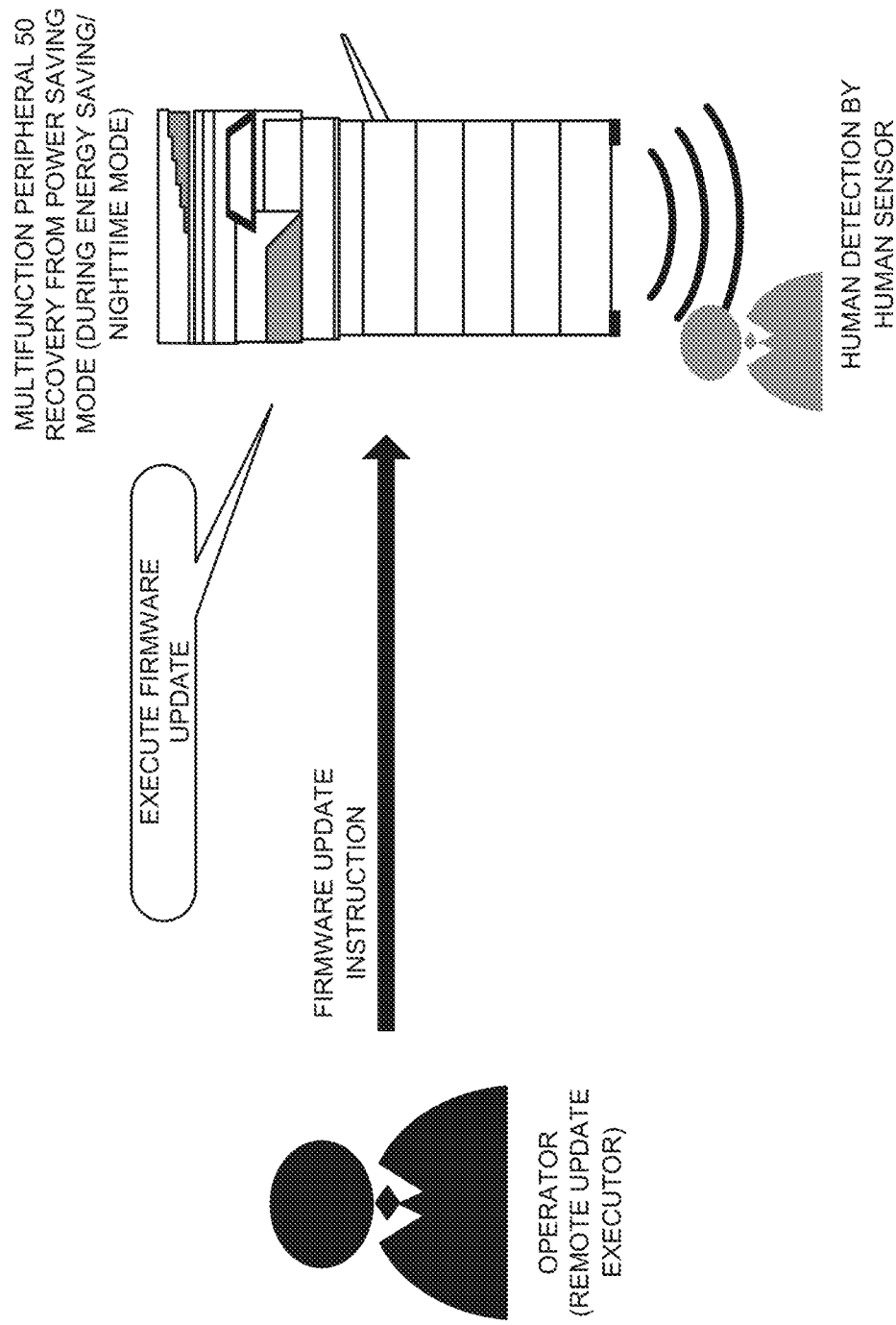
FIG. 16 is a diagram illustrating an operation example according to the second embodiment.

On the other hand, as illustrated in FIG. 16, in a case where the multifunction peripheral 50 returns from the power saving mode such as the energy saving mode or the nighttime mode, or in a case where the human sensor detects a person around the multifunction peripheral 50, the processing related to firmware update is performed.

As described above, according to the second embodiment, in addition to the advantageous effect of the first embodiment, it is possible to restrict update of firmware, in a case where an operation state of the multifunction peripheral 50 corresponds to a specific operation state when a firmware update instruction is input. A configuration as described above enables to perform appropriate firmware update according to an operation state of the multifunction peripheral 50.

3. Third Embodiment

A third embodiment is an embodiment in which, in a case where firmware update is cancelled via an update confirmation screen, and in a case where an operation state of a multifunction peripheral corresponds to a specific operation state when the update confirmation screen is displayed again, display of the update confirmation screen is restricted.

3.1 Functional Configuration

A functional configuration of the multifunction peripheral according to the third embodiment may be made identical to the functional configuration of the multifunction peripheral 50 according to the second embodiment. Therefore, the third embodiment is described by using the reference signs of constituent elements of the multifunction peripheral 50 according to the second embodiment.

3.2 Flow of Processing

Figure 17:
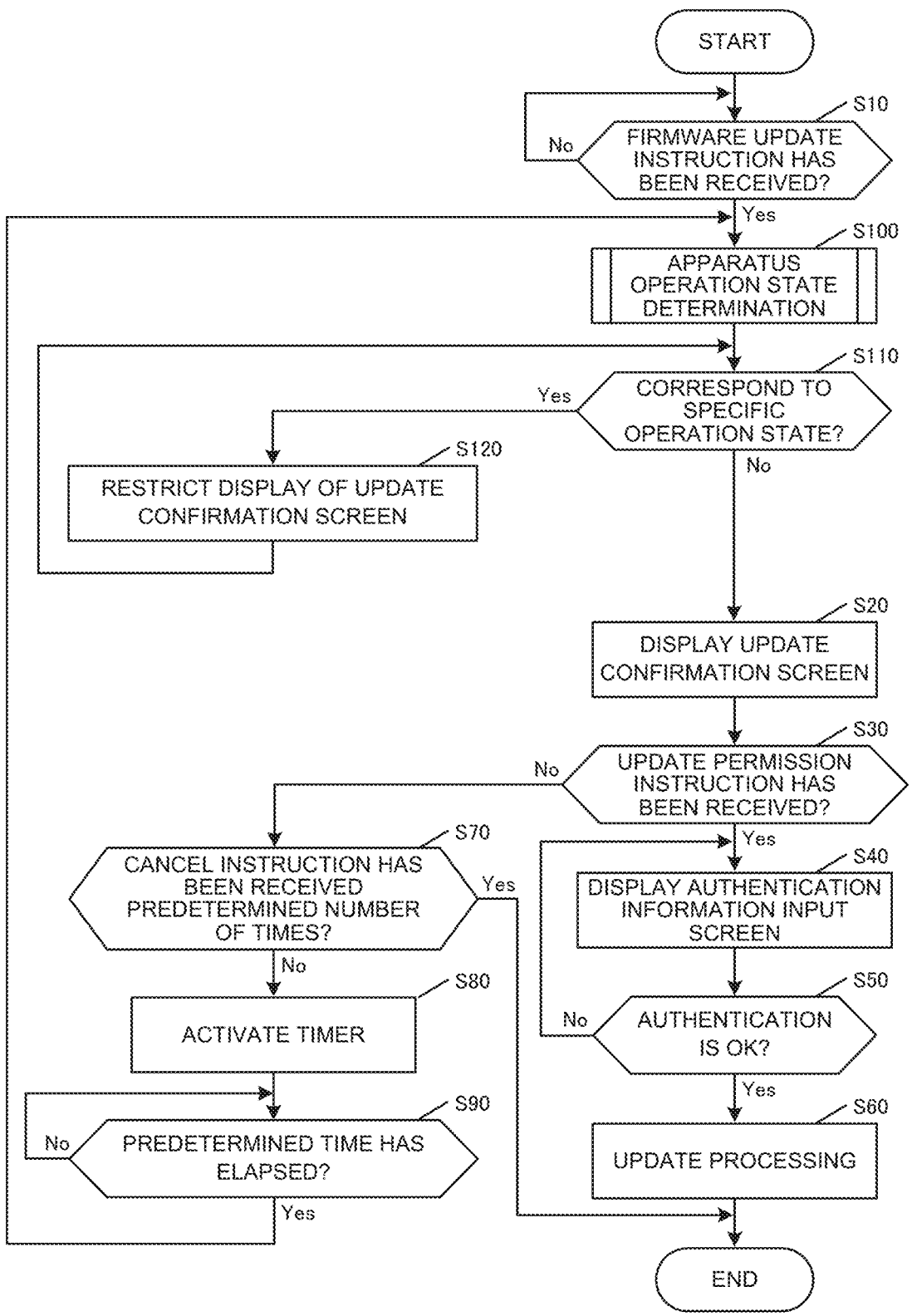
FIG. 17 is a flowchart illustrating a flow of processing according to a third embodiment.

The processing according to the third embodiment can be achieved by replacing the flowcharts in FIGS. 6 and 13 used in the description of the flow of processing according to the first or second embodiment with a flowchart in FIG. 17. Since the flow of processing described in FIG. 17 can be made substantially the same as the flow of processing related to FIG. 6 or FIG. 13, different processing is described.

In a case where it is determined that a predetermined time has elapsed from display of an update confirmation screen, a controller 11 returns the processing to step S100, and performs determination processing of an apparatus operation state (step S90; Yes→step S100).

The determination processing of an apparatus operation state can be performed according to a flowchart illustrated in FIG. 18. Since the determination processing described with reference to FIG. 18 can be made substantially the same processing as the determination processing described with reference to FIG. 14 in the second embodiment, different processing is described.

In a case where it is determined that the user has logged in to a multifunction peripheral 50, the controller 11 determines whether a content of a message to be displayed on the update confirmation screen satisfies a displayable condition set by the user (step S1007; Yes→step S1015). In a case where it is determined that the displayable condition set by the user is satisfied, the controller 11 determines that the multifunction peripheral 50 is not in a specific operation state, and finishes the processing (step S1015; Yes→step S1011). On the other hand, in a case where it is determined that the displayable condition set by the user is not satisfied, the controller 11 determines that the multifunction peripheral 50 is in the specific operation state, and finishes the processing (step S1015; No→step S1013).

The following condition examples set by the user via system settings, an operation screen, and the like can be exemplified as the displayable condition set by the user.

Condition 1

A firmware update message is not displayed again during execution of a job.

When the condition 1 is valid, the controller 11 does not display a message related to update again during execution of a job. After the job is completed, the controller 11 automatically displays the message.

Condition 2

A firmware update message is not displayed again.

When the condition 2 is valid, unlike the condition 1, the controller 11 does not display a message again regardless of whether a job is executed.

Condition 3

Time Specification

When the condition 3 is valid, the controller 11 does not display a message again during a set period of time. For example, in a case where time settings are set to "10:00 to 17:00", the controller 11 does not display a message again during the period of time.

Note that, as a configuration in which display of an update confirmation screen is restricted, in addition to processing of determining whether the multifunction peripheral 50 is in a specific operation state, for example, it is possible to configure in such a way that, in a case where an instruction to cancel an update instruction via the update confirmation screen is performed a predetermined number of times or more (correspond to Yes in step S70 in FIG. 13), a firmware update executor (operator) may be notified that the firmware update instruction has been canceled, and display of the update confirmation screen may be restricted until a firmware update instruction is input again.

As described above, according to the third embodiment, in addition to the advantageous effect of the first or second embodiment, it is possible to restrict display of an update confirmation screen, in a case where an operation state of the multifunction peripheral is in a specific operation state when the update confirmation screen is displayed again.

4. Fourth Embodiment

In the first embodiment to the third embodiment, in a case where the number of times of an instruction to cancel an update instruction via an update confirmation screen is less than a predetermined number of times, display of the update confirmation screen or display determination of the update confirmation screen is performed after a predetermined time elapses. A fourth embodiment is an embodiment in which firmware update is automatically performed, in a case where a predetermined time has elapsed without a user operation.

The fourth embodiment can be achieved by shifting processing to the update processing related to step S60, in a case where a determination result related to step S90 as to whether a predetermined time has elapsed is "Yes" in the processing described with reference to FIGS. 6, 13, and 17.

As described above, according to the fourth embodiment, in a case where a predetermined time has elapsed without a user operation, firmware update is automatically performed. This enables to reduce time and effort related to firmware update by the user.

5. Fifth Embodiment

Settings related to display and re-display of an update confirmation screen, and firmware update according to the present disclosure can be performed via a detail setting area R16 provided in a firmware update setting area R12 within an information display setting screen W10 (see FIG. 8). In a fifth embodiment, in addition to the configurations described in the foregoing embodiments, other configuration regarding display and redisplay of an update confirmation screen, and firmware update is described.

FIG. 19 is a diagram in which setting items settable via the detail setting area R16 are summarized as a table together with selectable setting values. Note that, the setting items illustrated in FIG. 19 are an example of setting items in which a setting value via the detail setting area R16 is selectable.

Regarding the setting item name related to No. 1 "start firmware update at a time of recovery from the power saving mode or recovery by human sensor detection", any of setting values "ON/OFF" can be selected. Since a configuration achievable by setting in the setting item related to No. 1 is a configuration described with reference to FIGS. 15 and 16 in the second embodiment, description thereof is omitted herein.

Regarding the setting item name related to No. 2 "notify to the executor at a time when remote firmware update has failed", any of setting values "ON/OFF" can be selected. A configuration achievable by setting in the setting item related to No. 2 is described with reference to FIG. 20.

Figure 20:
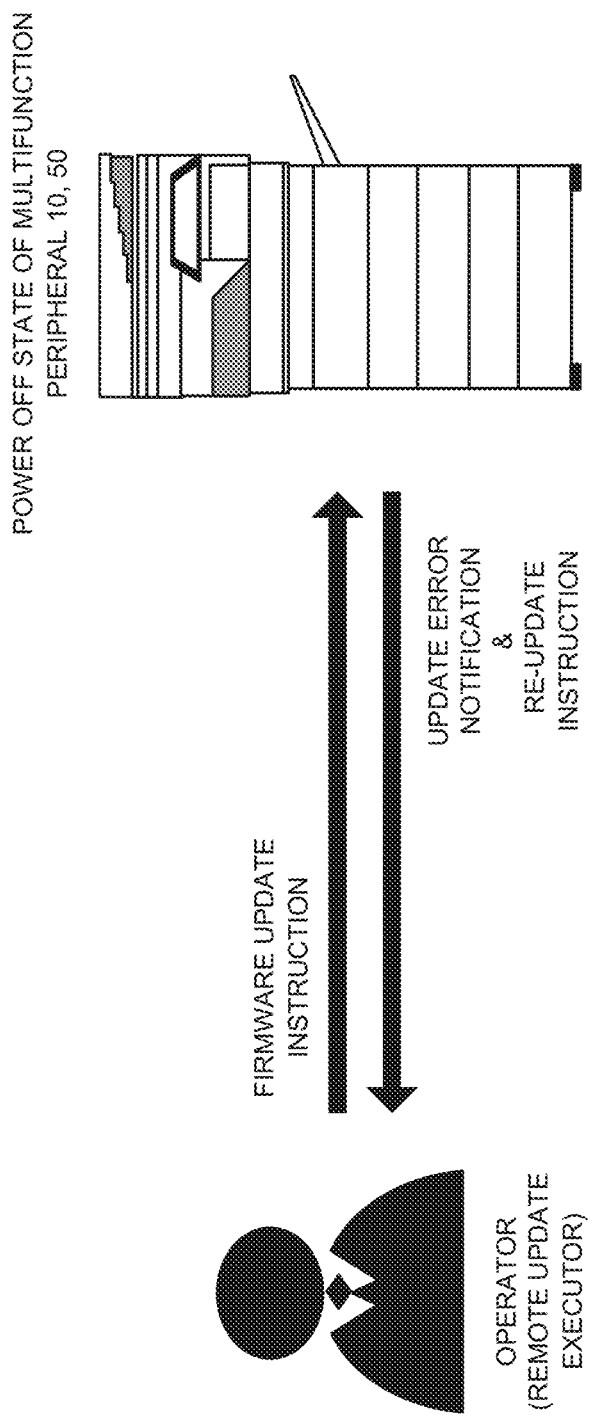
FIG. 20 is a diagram illustrating the fifth embodiment.

In FIG. 20, a firmware providing device 30 issues a firmware update instruction to a multifunction peripheral 10 or 50 (hereinafter, may be simply referred to as a multifunction peripheral 10, 50), based on an instruction from the operator. However, in a case where the multifunction peripheral 10, 50 is in a power off state, processing related to firmware update is not performed, and firmware update fails. In this case, the multifunction peripheral 10, 50 transmits, to the firmware providing device 30, an update error notification indicating that firmware update has failed, and an instruction to update again.

Regarding the setting item name related to No. 3 "start firmware update when power is turned on next time, in a case where a remote firmware update instruction is issued after power is turned off", any of setting values "ON/OFF" can be selected. A configuration achievable by setting in the setting item related to No 3 is described with reference to FIGS. 21 and 22.

Figure 21:
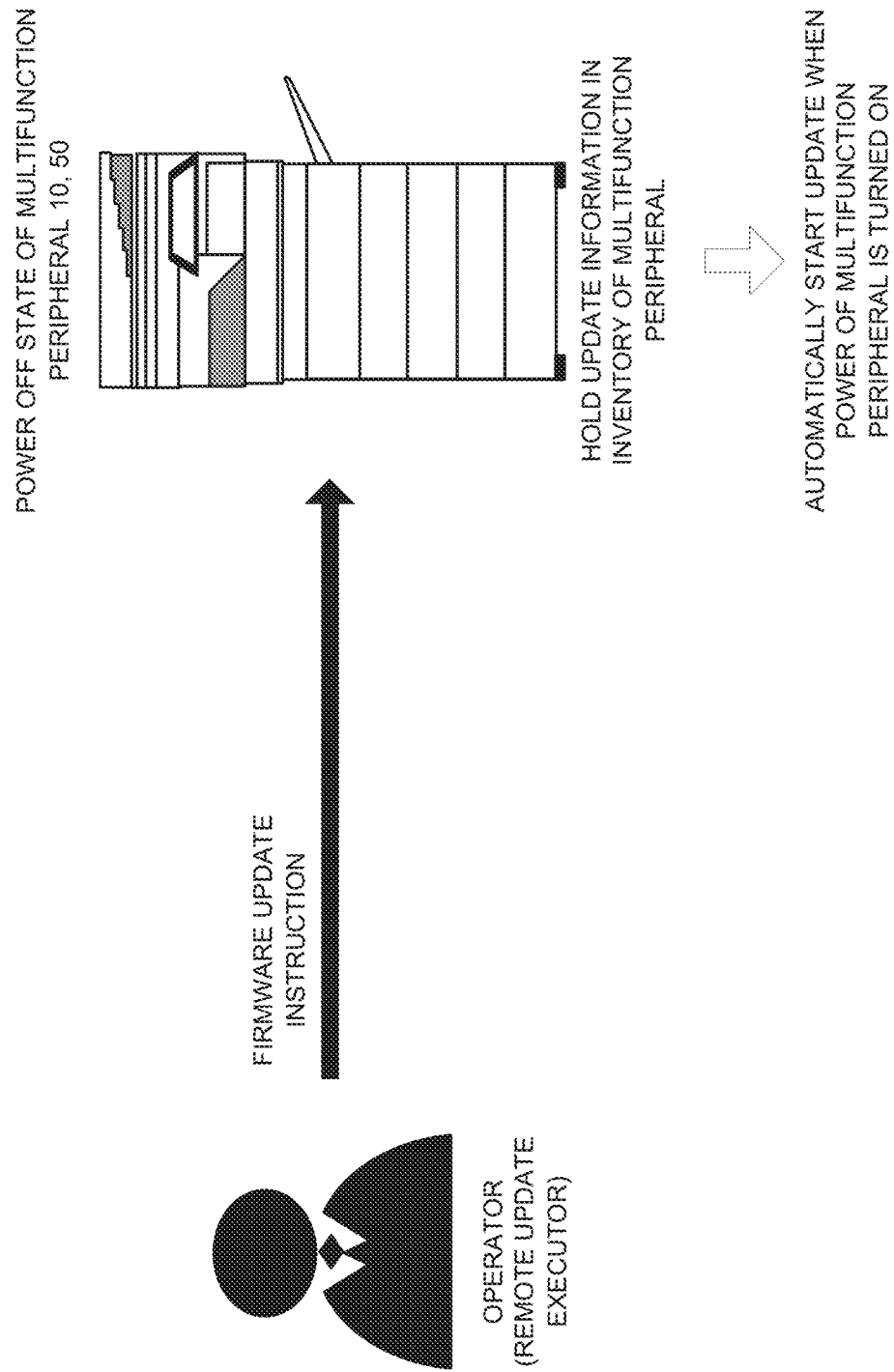
FIG. 21 is a diagram illustrating the fifth embodiment.

In FIG. 21, the firmware providing device 30 issues a firmware update instruction to the multifunction peripheral 10, 50, based on an instruction from the operator. In a case where the multifunction peripheral 10, 50 is in a power off state, processing related to firmware update is not performed. However, the multifunction peripheral 10, 50 can hold information related to a firmware update instruction in an inventory, and start processing related to firmware update at a timing when power is turned on.

Figure 22:
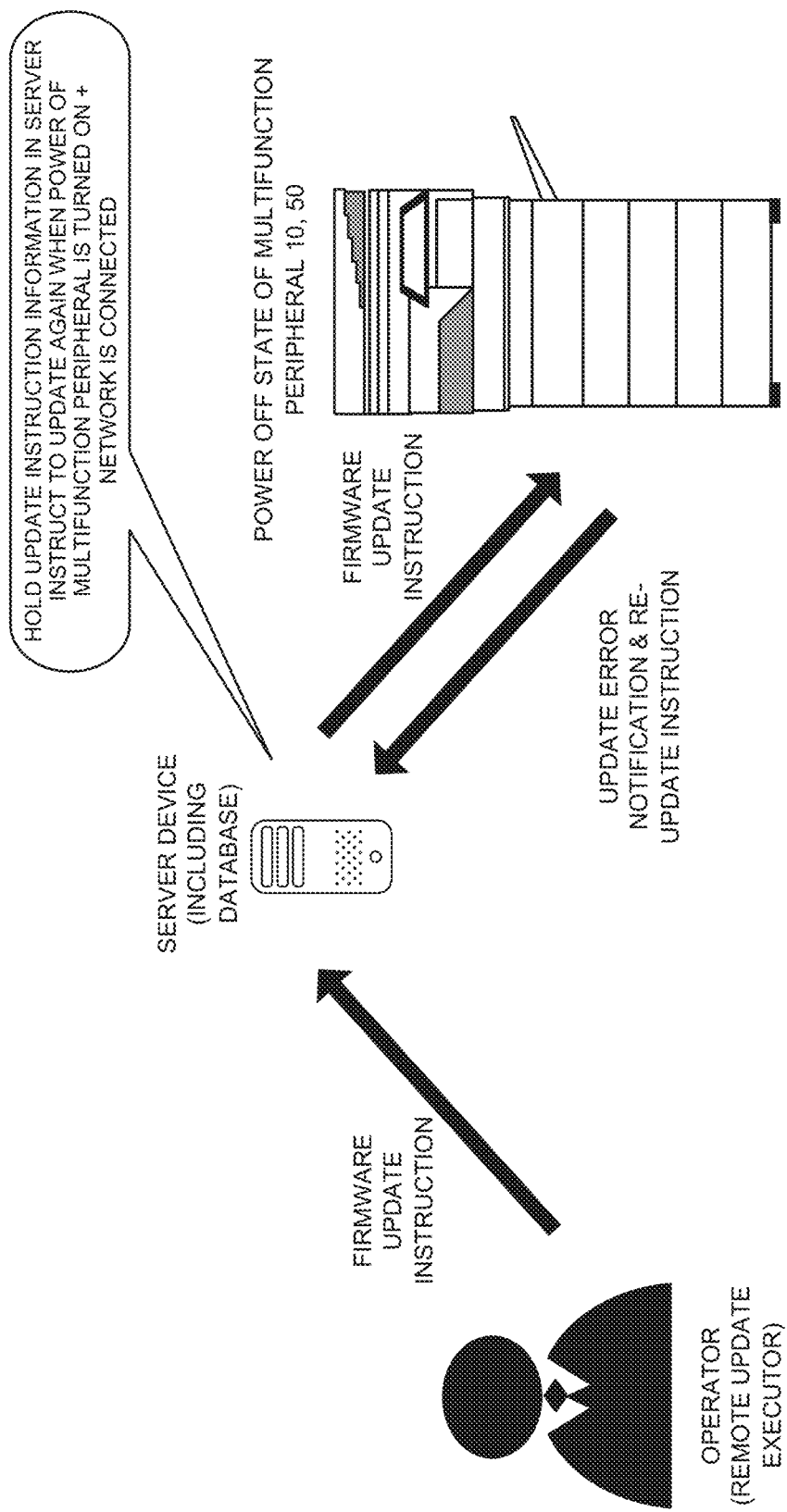
FIG. 22 is a diagram illustrating the fifth embodiment.

FIG. 22 illustrates a configuration in which a firmware update instruction is output to the multifunction peripheral 10, 50 via a server device (including a database). In a case where the multifunction peripheral 10, 50 is in a power off state, the multifunction peripheral 10, 50 transmits, to the server, an update error notification indicating that firmware update has failed, and an instruction to update again. The server holds information related to the firmware update instruction, and starts processing related to firmware update at a timing when power of the multifunction peripheral 10, 50 is turned on, and connection to a network is confirmed.

The setting item name related to No. 4 "display a warning message, in a case where a date and time (scheduled update date and time) is specified in remote firmware update", any of setting values "ON/OFF" can be selected. A configuration achievable by setting in the setting item related to No. 4 is described with reference to FIG. 23.

Figure 23:
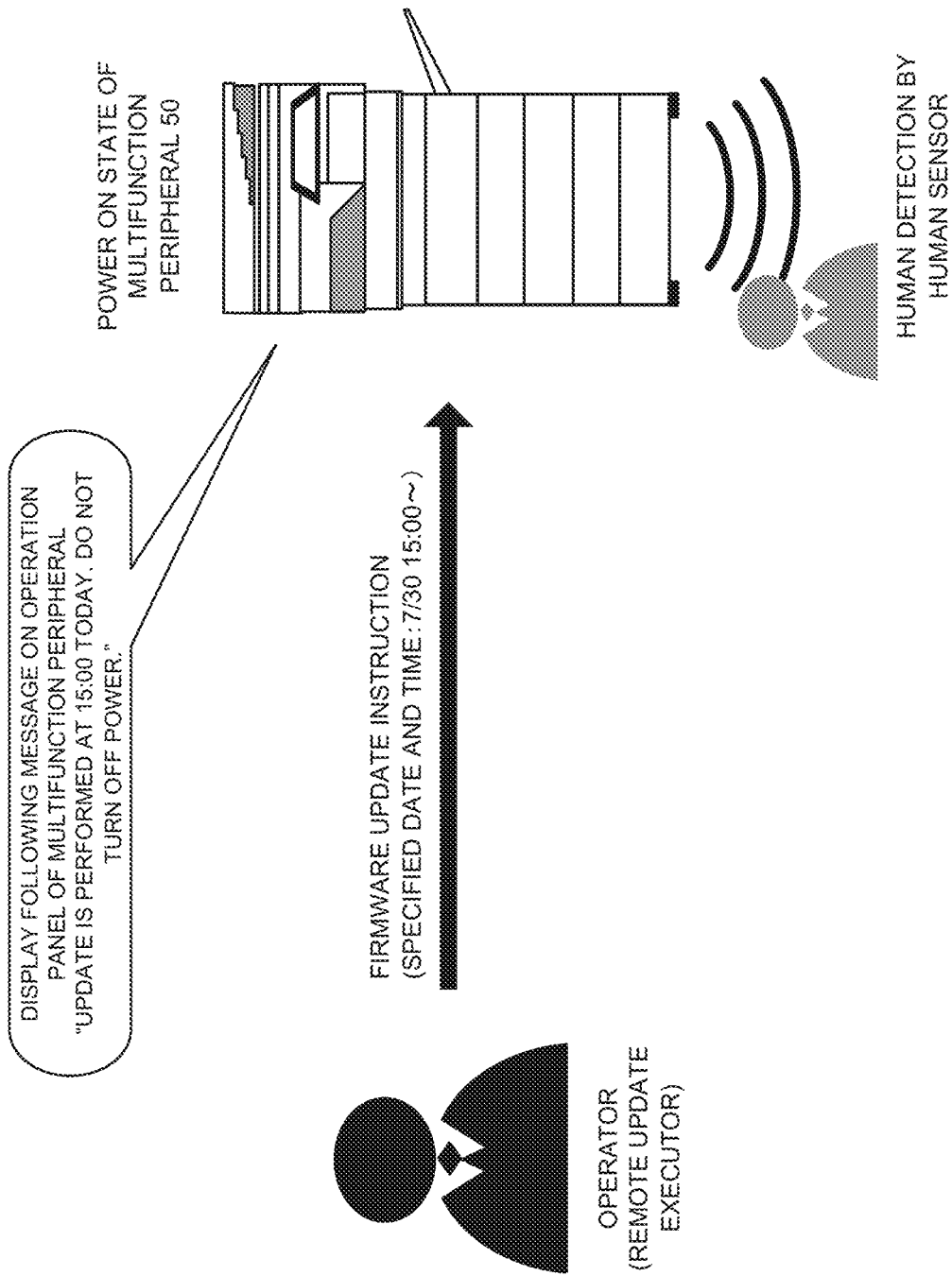
FIG. 23 is a diagram illustrating the fifth embodiment.

In FIG. 23, the firmware providing device 30 issues a firmware update instruction to the multifunction peripheral 50, based on an instruction from the operator. At this occasion, the firmware update instruction includes a warning message requesting not to turn off power of the multifunction peripheral 50 at a specified date and time. The warning message is displayed on a display 13, in a case where power of the multifunction peripheral 50 is turned on and before a job is executed, or in a case where a human sensor (detector 23) detects a person around the multifunction peripheral 50.

The setting item name related to No. 5 "start firmware update after a job is stopped or after a job is finished, in a case where a date and time are specified in remote firmware update, and when a job is operated/executed at a specified time", any of setting values "start update after a job is stopped/finished" can be selected. A configuration achievable by setting in the setting item related to No. 5 is described with reference to FIG. 24.

Figure 24:
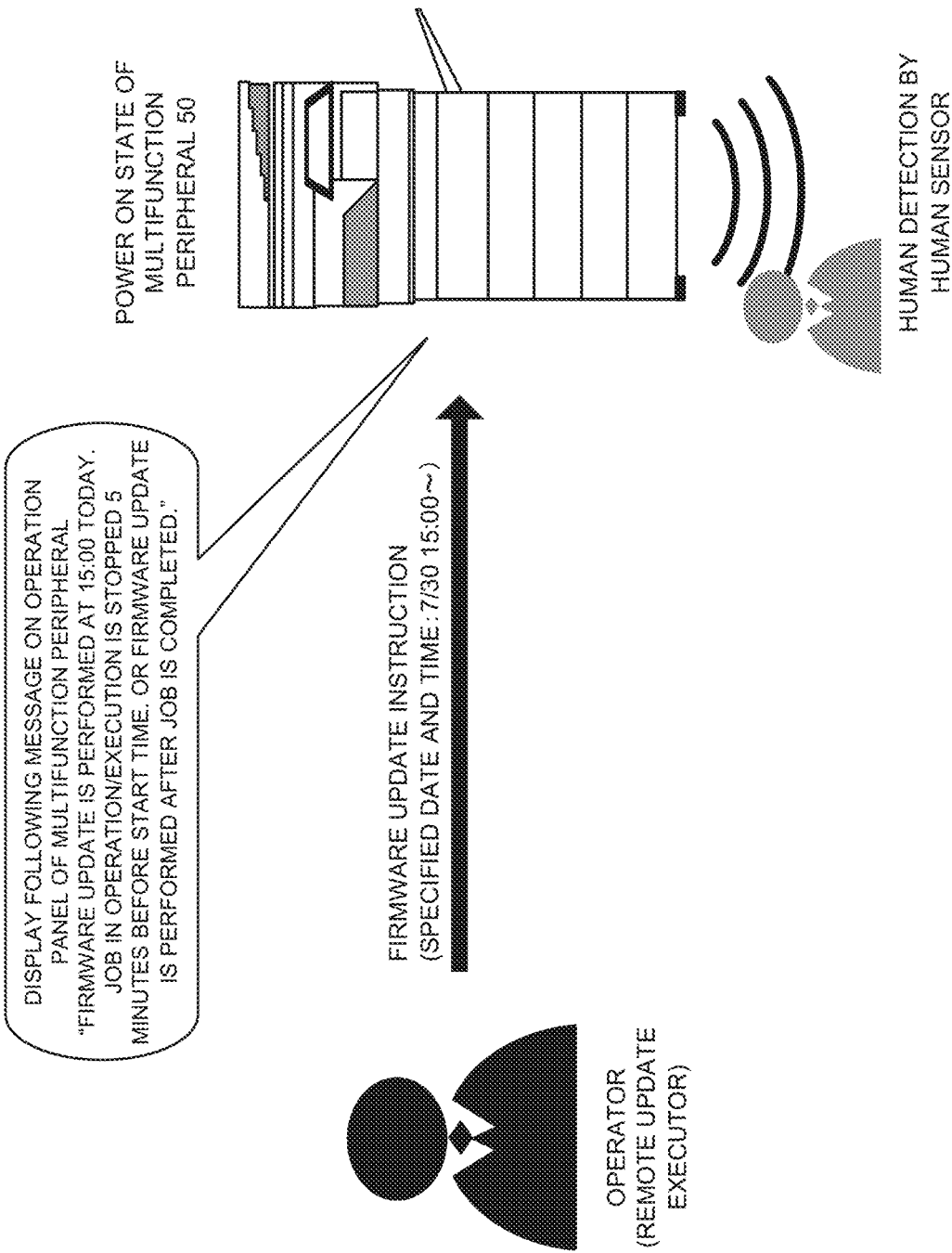
FIG. 24 is a diagram illustrating the fifth embodiment.

In FIG. 24, the firmware providing device 30 issues a firmware update instruction to the multifunction peripheral 50, based on an instruction from the operator. At this occasion, the firmware update instruction includes a warning message having a content that a job in operation/execution is stopped five minutes before the start time of the specified date and time, or a content that firmware update is executed after a job is completed (a case where "start update after a job is finished" is selected as a setting value), in a case where a job is operated/executed at the date and time. The warning message is displayed on the display 13, in a case where power of the multifunction peripheral 50 is turned on, or the human sensor detects a person around the multifunction peripheral 50.

Regarding the setting item name related to No. 6 "notify again to the executor, in a case where [cancel] is selected in a firmware update start message", any of setting values "ON/OFF" can be selected. A configuration achievable by setting in the setting item related to No. 6 is described with reference to FIG. 25.

Figure 25:
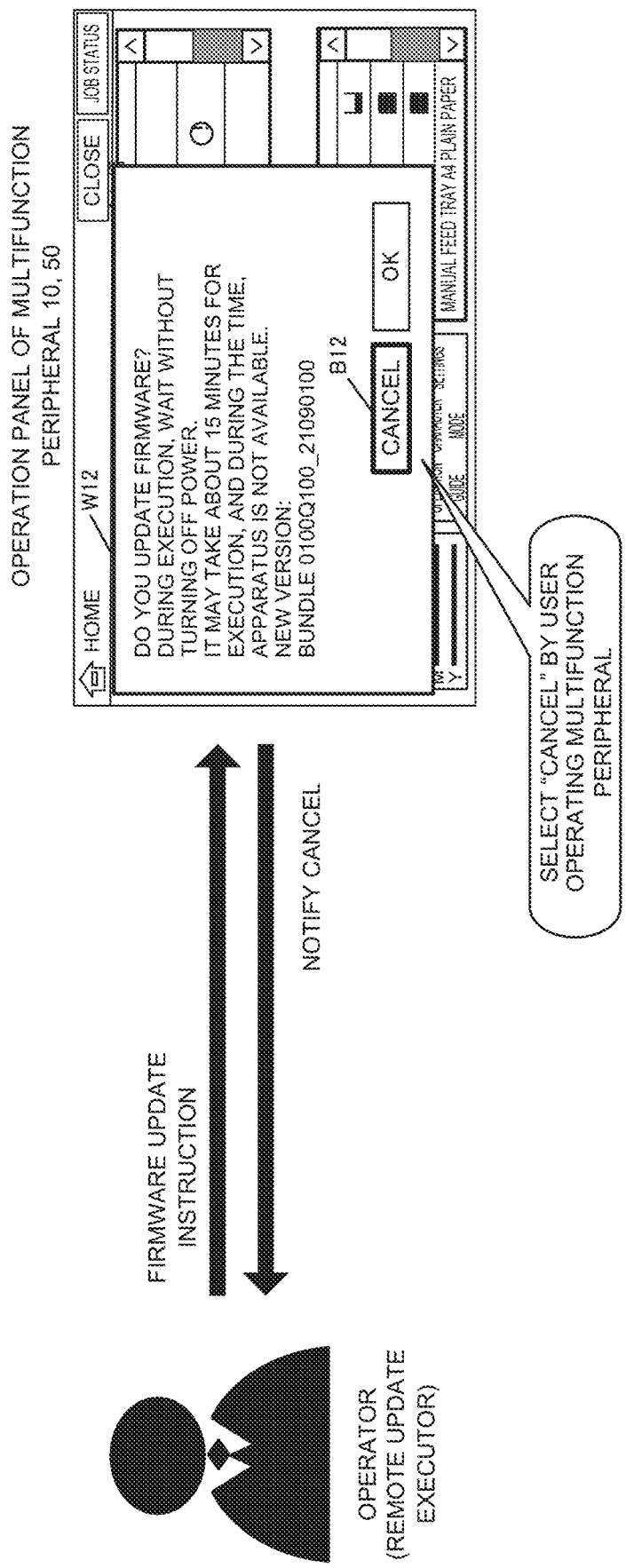
FIG. 25 is a diagram illustrating the fifth embodiment.

In FIG. 25, the firmware providing device 30 issues a firmware update instruction to the multifunction peripheral 10, 50, based on an instruction from the operator. The multifunction peripheral 10, 50 displays an update confirmation screen W12 related to firmware update. Then, when a cancel button B12 is selected by the user, the multifunction peripheral 10, 50 sends a cancel notification to the firmware providing device 30.

Regarding the setting item name related to No. 7 "a firmware update start message is changed at a timing when the message is displayed again", it is possible to select any of setting values "at a login time/after a job is finished/at an administrator login time/at a human sensor detection time". A configuration achievable by setting in the setting item related to No. 7 is described with reference to FIGS. 26, 27, and 28.

Figure 26:
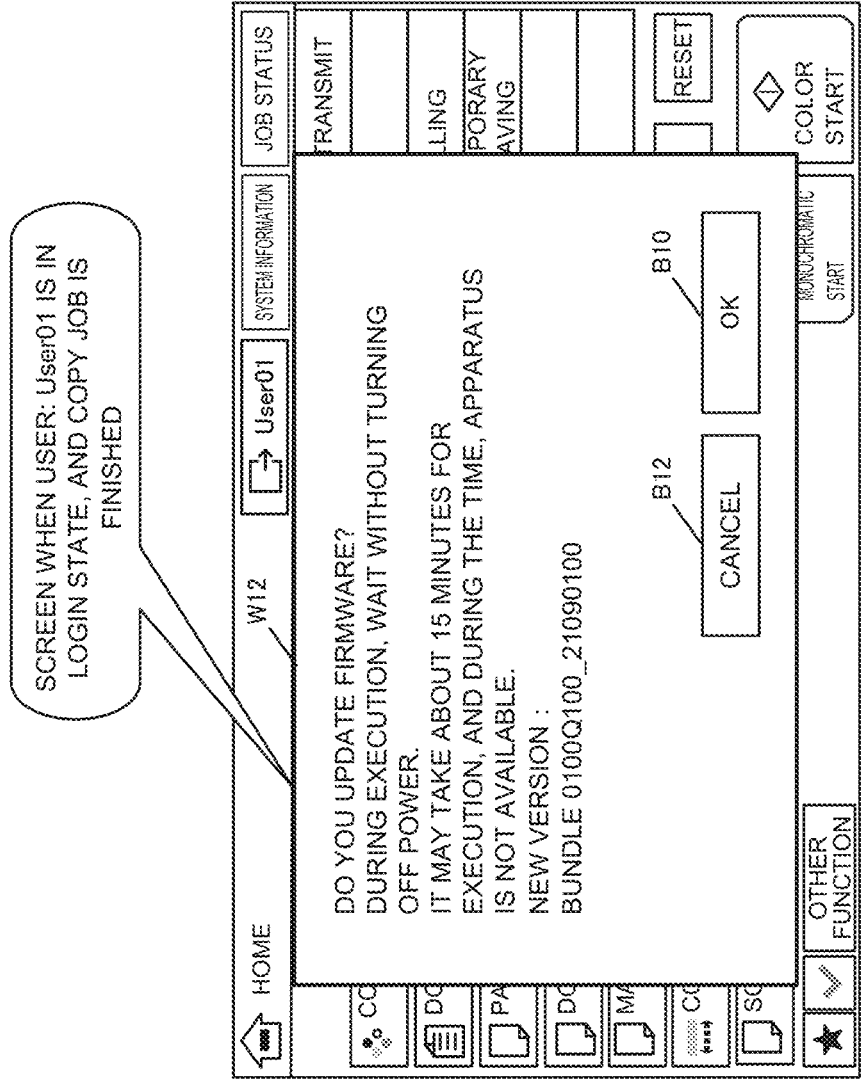
FIG. 26 is a diagram illustrating the fifth embodiment.

FIG. 26 is a diagram illustrating a display example of the update confirmation screen W12 in a case where "after a job is finished" is selected as a setting value in the setting item related to No. 7. In the setting item related to No. 7, in a case where "after a job is finished" is selected, the update confirmation screen W12 is not displayed even when a predetermined time (for example, 30 minutes) elapses when the user has logged out or while a job is executed, but the update confirmation screen W12 is displayed at a timing when the user: User01 has logged in, and a copy job is finished.

Figure 27:
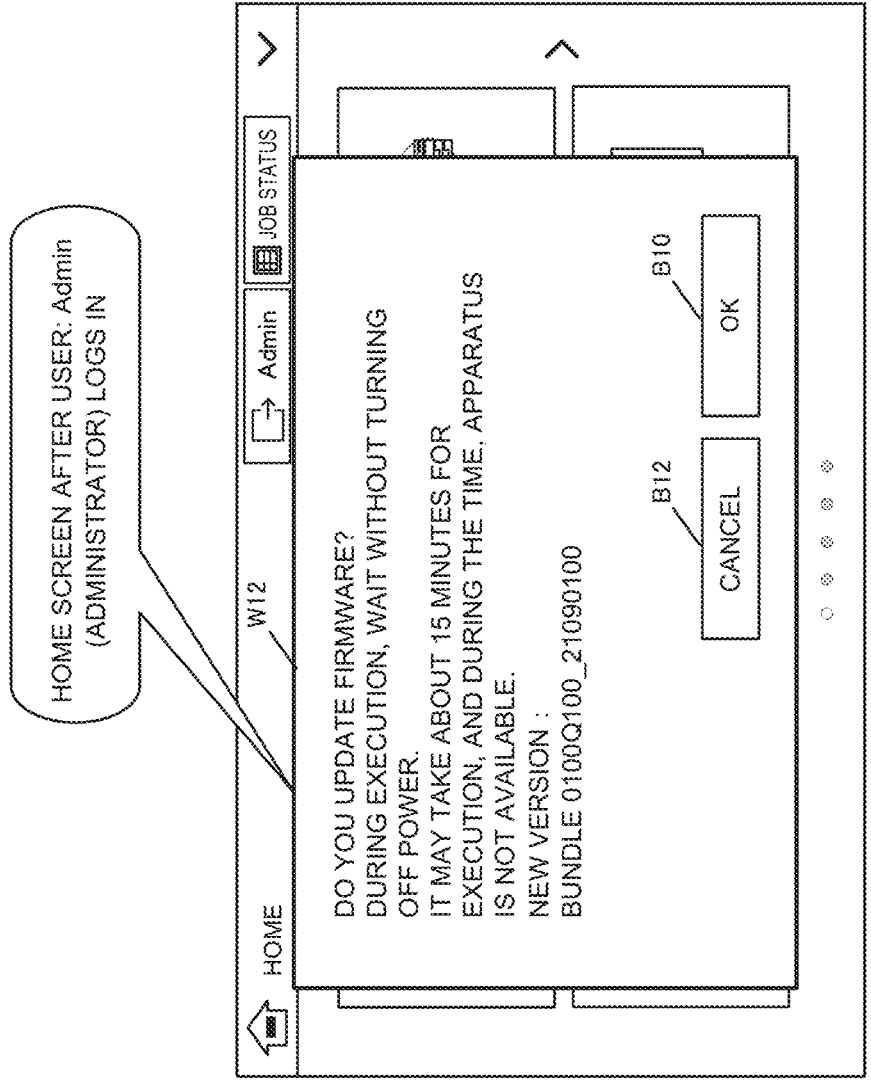
FIG. 27 is a diagram illustrating the fifth embodiment.

FIG. 27 is a diagram illustrating a display example of the update confirmation screen W12 in a case where "at an administrator login time" is selected as a setting value in the setting item related to No. 7. In a case where "at an administrator login time" is selected in the setting item related to No. 7, the update confirmation screen W12 is displayed at a timing when the administrator: Admin has logged in.

FIG. 28 is a diagram illustrating a display example of the update confirmation screen W12 in a case where "at a human sensor detection time" is selected as a setting value in the setting item related to No. 7. In a case where "at a human sensor detection time" is selected in the setting item related to No. 7, the update confirmation screen W12 is displayed at a timing when the human sensor detects a person around the multifunction peripheral 50.

As described above, according to the fifth embodiment, in addition to the advantageous effects of the first to fourth embodiments, it is possible to easily perform display and re-display of an update confirmation screen associated with various configurations, and settings related to firmware update via the detail setting area R16 provided in the firmware update setting area R12. This enables to improve operability and convenience of the user.

The present disclosure is not limited to the above-described embodiments, and various modifications are available. Specifically, embodiments to be acquired by appropriately combining modified technical means within a range that does not depart from the gist of the present disclosure are also included in the technical scope of the present disclosure.

In addition, the above-described embodiments have parts that are described separately for convenience of description. However, it is needless to say that the embodiments may be combined and implemented within the technically possible range.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming apparatus comprising:
    a display; and
    one or more controllers that control update processing of firmware for driving a device, wherein
    the one or more controllers:
        display, on the display, a first screen for confirming to a user whether to update the firmware in a case that an instruction to update the firmware is received,
        display, on the display, a second screen for receiving an input of authentication information from an administrator in a case that an update of the firmware is permitted,
        re-display the first screen after a predetermined time has elapsed in a case that the update of the firmware is not permitted, and
        restrict re-display of the first screen in a case that an operation state of the devi, after the predetermined time has elapsed, corresponds to any one of states in which the update of the firmware is not permitted for a predetermined number of times, the device is in a power saving mode, a human sensor for detecting a person around the device does not detect the person, the device is executing a job, a user is not logged into the device, and a displayable condition of the first screen set by a user is not satisfied.

* * * * *